United States Patent
Biswas et al.

(10) Patent No.: US 12,522,721 B2
(45) Date of Patent: Jan. 13, 2026

(54) POLYETHYLENE COMPOSITIONS, FILMS, AND ARTICLES

(71) Applicant: Dow Global Technologies LLC, Midland, MI (US)

(72) Inventors: Sanjib Biswas, Manvel, TX (US); Jacquelyn A. Degroot, Sugarland, TX (US); Mehmet Demirors, Pearland, TX (US); Erica Spiekermann, Houston, TX (US); John A. Naumovitz, Midland, MI (US); Douglas S. Ginger, Freeport, TX (US); Dibyaranjan Mekap, Pearland, TX (US)

(73) Assignee: Dow Global Technologies LLC, Midland, MI (US)

( * ) Notice: Subject to any disclaimer, the term of this patent is extended or adjusted under 35 U.S.C. 154(b) by 171 days.

(21) Appl. No.: 18/252,570

(22) PCT Filed: Dec. 9, 2021

(86) PCT No.: PCT/US2021/062637
§ 371 (c)(1),
(2) Date: May 11, 2023

(87) PCT Pub. No.: WO2022/164518
PCT Pub. Date: Aug. 4, 2022

(65) Prior Publication Data
US 2023/0407065 A1    Dec. 21, 2023

Related U.S. Application Data

(60) Provisional application No. 63/141,516, filed on Jan. 26, 2021.

(51) Int. Cl.
*C08L 23/06* (2006.01)
*B65D 65/40* (2006.01)
*C08J 5/18* (2006.01)

(52) U.S. Cl.
CPC .............. *C08L 23/06* (2013.01); *B65D 65/40* (2013.01); *C08J 5/18* (2013.01); *C08J 2323/06* (2013.01); *C08J 2423/06* (2013.01); *C08L 2203/162* (2013.01); *C08L 2205/025* (2013.01); *C08L 2205/03* (2013.01)

(58) Field of Classification Search
None
See application file for complete search history.

(56) References Cited

U.S. PATENT DOCUMENTS

| | | | |
|---|---|---|---|
| 8,835,567 B2 | 9/2014 | Demirors et al. | |
| 9,752,021 B2 | 9/2017 | Demirors et al. | |
| 9,834,712 B2 | 12/2017 | Kapur et al. | |
| 2017/0129229 A1 | 5/2017 | Wang et al. | |
| 2018/0079897 A1 | 3/2018 | Wang et al. | |

FOREIGN PATENT DOCUMENTS

| | | |
|---|---|---|
| EP | 2449025 | 5/2012 |
| EP | 2906423 | 8/2015 |
| WO | 2013188950 | 12/2013 |
| WO | 2015200743 | 12/2015 |
| WO | 2019133400 | 7/2019 |
| WO | 2019234637 | 12/2019 |

OTHER PUBLICATIONS

PCT/US2021/062637, International Search Report and Written Opinion with a mailing date of Mar. 22, 2022.

*Primary Examiner* — Ramsey Zacharia
(74) *Attorney, Agent, or Firm* — Jacob R. Graham

(57) ABSTRACT

Embodiments of a polyethylene composition are provided, which may include a first polyethylene fraction comprising at least one peak in a temperature range of from 40 C to 75 C in an elution profile via improved comonomer composition distribution (iCCD) analysis method, where a first polyethylene area fraction is an area in the elution profile from 40 C to 75 C, and where the first polyethylene fraction area comprises from 45% to 65% of the total area of the elution profile; and a second polyethylene fraction comprising at least one peak in a temperature range of from 85 C to 110 C in the elution profile, where a second polyethylene area fraction is an area in the elution profile from 85 C to 110 C, and where the second polyethylene fraction area comprises from 15% to 35% of the total area of the elution profile, wherein the polyethylene composition has a density of 0.905 g/cm3 to 0.918 g/cm3, a melt index ($I_2$) of 0.7 g/10 minutes to 3.5 g/10 minutes, and wherein the composition has a melt index ratio ($I_{10}/I_2$) that meets the following equation: $I_{10}/I_2 < 7.0 - 1.2 \log(I_2)$.

9 Claims, 2 Drawing Sheets

POLYETHYLENE COMPOSITIONS, FILMS, AND ARTICLES

TECHNICAL FIELD

The instant application is directed to polymer compositions, to films comprising such polyethylene compositions, and to articles.

BACKGROUND

The use of polyolefin compositions in packaging applications is generally known. A variety of conventional methods may be employed to produce such polyolefin compositions. Various polymerization techniques using different catalyst systems have been employed to produce such polyolefin compositions suitable for packaging applications. However, despite the research efforts in developing compositions suitable for, in some embodiments, packaging applications, there is still a need for improved polyethylene compositions suitable for packaging applications that may have a good balance of properties and processability at desired polymer composition densities.

BRIEF SUMMARY

The instant application discloses polyethylene compositions suitable for packaging applications, films, multilayer structures, and articles made therefrom. In some embodiments, the presently-disclosed polyethylene compositions are suitable for use in sealant layers for films to be used in packaging applications.

Conventional films, for example, those that utilize a sealant layer, typically experience a tradeoff between the hot tack initiation temperature, the heat seal initiation temperature, or both, and the overall density of the film. The density of a composition can have an effect on processing characteristics of the film. For example, films that include conventional polyethylene compositions having relatively lower densities tend to provide films that exhibit lower hot tack initiation temperatures, heat seal initiation temperatures, or both, when compared to films that include compositions with relatively higher overall densities. Polyethylene compositions having relatively lower densities can also be particularly difficult to process in conventional blown film applications due to the very low melting point and tacky or sticky nature of the material. Conversely, films having a relatively higher overall density often exhibit higher hot tack initiation temperatures, heat seal initiation temperatures, or both. In some packaging applications, lower hot tack and heat seal initiation temperature may be desirable polymer performance characteristics. Accordingly, there remains a need for polyethylene compositions that provide an improved hot tack window, hot tack strength and/or heat seal initiation temperature when used in a sealant layer of a film. The presently-disclosed polyethylene compositions may be used in films to provide improved hot tack window, hot tack strength and/or heat seal initiation temperature when used in a sealant layer, in various embodiments.

As is described in detail herein, polymer compositions may be evaluated by improved comonomer composition distribution (iCCD) analysis. Embodiments of the present disclosure may meet the needs described above regarding broad hot tack window, hot tack strength and/or heat seal initiation temperature by providing polyethylene compositions that, in some embodiments, include at least two polyethylene fractions in particular temperature ranges via iCCD analysis that each include a desired percentage of the total area of the elution profile. Such polyethylene compositions may have desirable hot tack windows, hot tack strengths, and/or heat seal initiation temperatures, or both, while having a density of, for example, at least 0.905 g/cm$^3$. Without being bound by theory, it is believed that at least some of the presently described polyethylene compositions may have such properties due at least in part to a particular multi-modal elution profile where a first polyethylene fraction and a second polyethylene fraction display peaks at 40° C. to 75° C. and 85° C. to 110° C., respectively, in the elution profile of an iCCD analysis.

According to one or more embodiments, a polyethylene composition suitable for packaging applications comprises (a) a first polyethylene fraction having a single peak in a temperature range of 40° C. to 75° C. in an elution profile via improved comonomer composition distribution (iCCD) analysis method, wherein a first polyethylene area fraction is an area in the elution profile beneath the single peak of the first polyethylene fraction between 40 and 75° C., and wherein the first polyethylene fraction area comprises from 45% to 65% of the total area of the elution profile; and (b) a second polyethylene fraction in a temperature range of 85° C. to 110° C. in the elution profile via iCCD analysis method and wherein a second polyethylene area fraction is an area in the elution profile beneath the single peak of the second polyethylene fraction between 85° C. and 110° C., and wherein a second polyethylene area fraction is an area in the elution profile beneath the at least one peak of the second polyethylene fraction between 85 and 110° C., and wherein the second polyethylene fraction area comprises from 15% to 35% of the total area of the elution profile; wherein the polyethylene composition has a density of 0.905 g/cm$^3$ to 0.918 g/cm$^3$, a melt index ($I_2$) of 0.7 g/10 minutes to 3.5 g/10 minutes, and wherein the composition has a melt index ratio ($I_{10}/I_2$) that meets the following equation: $I_{10}/I_2 < 7.0 - 1.2 \log (I_2)$.

According to one or more embodiments, a film may comprise the polyethylene composition described above or in any of the other embodiments described herein.

According to one or more embodiments, an article may comprise the polyethylene composition described above or in any of the other embodiments described herein.

BRIEF DESCRIPTION OF THE DRAWINGS

The following detailed description of specific embodiments of the present disclosure can be best understood when read in conjunction with the following drawings, where like structure is indicated with like reference numerals and in which.

DETAILED DESCRIPTION

Figure 1:
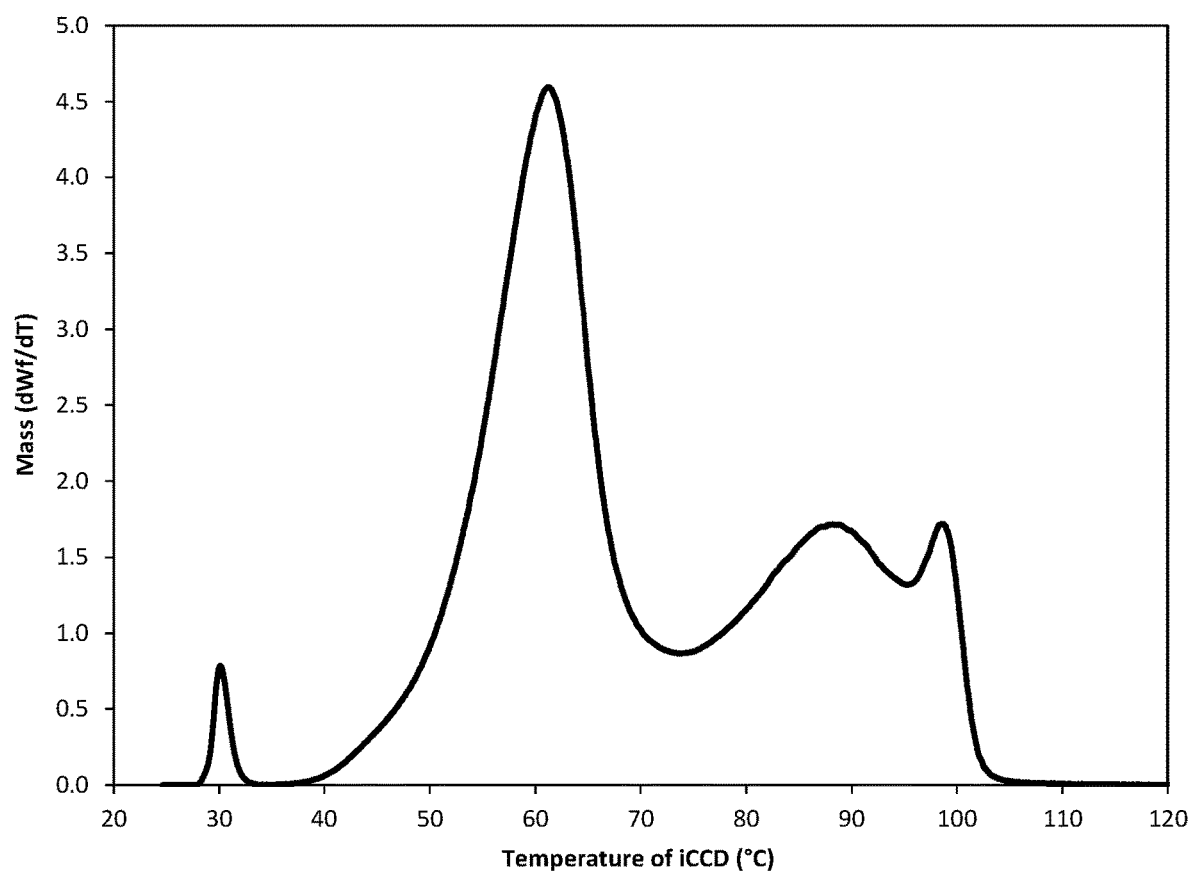
FIG. 1 schematically depicts an iCCD elution profile, according to one or more embodiments presently described.

Described herein are embodiments of polyethylene compositions. Such polyethylene compositions can be used, for example, in packaging applications. The polyethylene compositions may include a first polyethylene fraction and a second polyethylene fraction. The polyethylene composition may be included in a film (including monolayer films and multilayer films) or other articles such as multilayer structures and packages.

As described herein, a "polyethylene" or "ethylene-based polymer" refers to polymers comprising a majority amount (>50 mol %) of units which have been derived from ethylene monomer. This includes polyethylene homopolymers or copolymers (meaning units derived from two or more comonomers). Common forms of polyethylene known in the art include Low Density Polyethylene (LDPE); Linear Low Density Polyethylene (LLDPE); Ultra Low Density Polyethylene (ULDPE); Very Low Density Polyethylene (VLDPE); single-site catalyzed Linear Low Density Polyethylene, including both linear and substantially linear low density resins (m-LLDPE); ethylene-based plastomers and ethylene-based elastomers; Medium Density Polyethylene (MDPE); and High Density Polyethylene (HDPE). These polyethylene materials are generally known in the art; however, the following descriptions may be helpful in understanding the differences between some of these different polyethylene resins.

The term "composition," as used herein, refers to a mixture of materials which comprises the composition, as well as reaction products and decomposition products formed from the materials of the composition.

The term "LDPE" may also be referred to as "high pressure ethylene polymer" or "highly branched polyethylene" and may be defined to mean that the polymer is partly or entirely homo-polymerized or copolymerized in autoclave or tubular reactors at pressures above 14,500 psi (100 MPa) with the use of free-radical initiators, such as peroxides (see for example U.S. Pat. No. 4,599,392, which is hereby incorporated by reference). LDPE resins typically have a density in the range of 0.916 to 0.935 g/cm$^3$.

The term "LLDPE", includes both resin made using the traditional Ziegler-Natta catalyst systems and chromium-based catalyst systems as well as single-site catalysts, including, but not limited to, substituted mono- or bis-cyclopentadienyl catalysts (typically referred to as metallocene), constrained geometry catalysts, phosphinimine catalysts & polyvalent aryloxyether catalysts (typically referred to as bisphenyl phenoxy), and includes linear, substantially linear or heterogeneous polyethylene copolymers or homopolymers. LLDPEs contain less long chain branching than LDPEs and includes the substantially linear ethylene polymers which are further defined in U.S. Pat. Nos. 5,272,236, 5,278,272, 5,582,923 and 5,733,155; the homogeneously branched linear ethylene polymer compositions such as those in U.S. Pat. No. 3,645,992; the heterogeneously branched ethylene polymers such as those prepared according to the process disclosed in U.S. Pat. No. 4,076,698; and/or blends thereof (such as those disclosed in U.S. Pat. No. 3,914,342 or U.S. Pat. No. 5,854,045). The LLDPEs can be made via gas-phase, solution-phase or slurry polymerization or any combination thereof, using any type of reactor or reactor configuration known in the art.

The term "MDPE" refers to polyethylenes having densities from 0.924 to 0.936 g/cm$^3$. "MDPE" is typically made using chromium or Ziegler-Natta catalysts or using single-site catalysts including, but not limited to, substituted mono- or bis-cyclopentadienyl catalysts (typically referred to as metallocene), constrained geometry catalysts, phosphinimine catalysts and polyvalent aryloxyether catalysts (typically referred to as bisphenyl phenoxy).

The term "HDPE" refers to polyethylenes having densities greater than about 0.935 g/cm$^3$ and up to about 0.980 g/cm$^3$, which are generally prepared with Ziegler-Natta catalysts, chrome catalysts or single-site catalysts including, but not limited to, substituted mono- or bis-cyclopentadienyl catalysts (typically referred to as metallocene), constrained geometry catalysts, phosphinimine catalysts & polyvalent aryloxyether catalysts (typically referred to as bisphenyl phenoxy).

The term "ULDPE" refers to polyethylenes having densities of 0.855 to 0.912 g/cm$^3$, which are generally prepared with Ziegler-Natta catalysts, chrome catalysts, or single-site catalysts including, but not limited to, substituted mono- or bis-cyclopentadienyl catalysts (typically referred to as metallocene), constrained geometry catalysts, phosphinimine catalysts & polyvalent aryloxyether catalysts (typically referred to as bisphenyl phenoxy). ULDPEs include, but are not limited to, polyethylene (ethylene-based) plastomers and polyethylene (ethylene-based) elastomers. Polyethylene (ethylene-based) elastomers or plastomers generally have densities of 0.855 to 0.912 g/cm$^3$.

"Blend," "polymer blend," and like terms mean a composition of two or more polymers. Such a blend may or may not be miscible. Such a blend may or may not be phase separated. Such a blend may or may not contain one or more domain configurations, as determined from transmission electron spectroscopy, light scattering, x-ray scattering, and any other method known in the art. Blends are not laminates, but one or more layers of a laminate may contain a blend. Such blends can be prepared as dry blends, formed in situ (e.g., in a reactor), melt blends, or using other techniques known to those skilled in the art.

Unless stated to the contrary, implicit from the context, or customary in the art, all parts and percent values are based on weight, all temperatures are in ° C., and all test methods are current as of the filing date of this disclosure.

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. The term "consisting of" excludes any component, step or procedure not specifically delineated or listed.

Polyethylene Composition and Characterization

In one or more embodiments, the polyethylene composition may have a density of 0.905 g/cm$^3$ to 0.918 g/cm$^3$. For example, embodiments of the presently-disclosed polyethylene compositions may have densities of from 0.905 g/cm$^3$ to 0.916 g/cm$^3$, from 0.905 g/cm$^3$ to 0.915 g/cm$^3$, from 0.905 g/cm$^3$ to 0.914 g/cm$^3$, from 0.905 g/cm$^3$ to 0.912 g/cm$^3$, from 0.907 g/cm$^3$ to 0.918 g/cm$^3$, from 0.907 g/cm$^3$ to 0.916 g/cm$^3$, from 0.907 g/cm$^3$ to 0.914 g/cm$^3$, from 0.907 g/cm$^3$ to 0.912 g/cm$^3$, from 0.909 g/cm$^3$ to 0.918 g/cm$^3$, from 0.909 g/cm$^3$ to 0.916 g/cm$^3$, from 0.909 g/cm$^3$ to 0.914 g/cm$^3$, from 0.910 g/cm$^3$ to 0.918 g/cm$^3$, from 0.910 g/cm$^3$ to 0.916 g/cm$^3$, from 0.910 g/cm$^3$ to 0.914 g/cm$^3$, or any combination of these ranges.

In one or more embodiments, the polyethylene composition may have a melt index ($I_2$) of 0.70 g/10 minutes to 3.5 g/10 minutes. For example, in one or more embodiments, the polyethylene composition may have a melt index ($I_2$) of from 0.7 g/10 minutes to 3.0 g/10 minutes, from 0.7 g/10 minutes to 2.5 g/10 minutes, from 0.7 g/10 minutes to 2.0 g/10 minutes, from 0.7 g/10 minutes to 1.5 g/10 minutes, from 0.85 g/10 minutes to 3.5 g/10 minutes, from 0.85 g/10 minutes to 3.0 g/10 minutes, from 0.85 g/10 minutes to 2.5 g/10 minutes, from 0.85 g/10 minutes to 2.0 g/10 minutes, from 0.85 g/10 minutes to 1.5 g/10 minutes, or any combination of these ranges.

In one or more embodiments, the polyethylene composition may have a melt index ratio ($I_{10}/I_2$) less than 7.0. For example, in one or more embodiments, the polyethylene composition may have a melt index ratio ($I_{10}/I_2$) from 6.0 to 6.9, from 6.0 to 6.7, from 6.0 to 6.4, or any combination of these ranges.

In one or more embodiments, the polyethylene composition may have a melt index ratio ($I_{10}/I_2$) that meets the following equation: $I_{10}/I_2 < 7.0 - 1.2 \log(I_2)$.

In one or more embodiments, the polyethylene composition may have a Molecular Weighted Comonomer Distribution Index (MWCDI) less than 1.0. For example, in one or more embodiments, the polyethylene composition may have a MWCDI of from 0.0 to 2.0, from 0.0 to 1.5, from 0.0 to 1.0, from 0.0 to 0.5, from 0.1 to 1.0 from 0.1 to 1.5, or any combination of these ranges.

According to one or more embodiments, the polyethylene composition may have a weight average molecular weight ($M_w$) in the range from 100,000 to 130,000 g/mole. For example, in one or more embodiments, the polyethylene composition may have a weight average molecular weight ($M_w$) from 105,000 to 130,000 g/mole, from 105,000 to 125,000 g/mole, from 105,000 to 120,000 g/mole, from 105,000 to 115,000 g/mole, from 110,000 to 130,000 g/mole, from 110,000 to 125,000 g/mole, from 110,000 to 120,000 g/mole, from 115,000 to 130,000 g/mole, or any combination of these ranges.

According to one or more embodiments, the polyethylene composition may have a molecular weight distribution, expressed as the ratio of the weight average molecular weight to number average molecular weight (Mw/Mn), in the range of from 2.0 to 4.0. For example, the polyethylene composition may have a molecular weight distribution of from 2.0 to 3.5, 2.5 to 4.0, 2.5 to 3.5, 2.0 to 3.3, 2.0 to 3.2, 2.5 to 3.3, 2.5 to 3.2, or any combination of these ranges. As presently described, the molecular weight distribution may be calculated according to gel permeation chromatography (GPC) techniques as described herein.

According to one or more embodiments, the polyethylene composition may have a z-average molecular weight ($M_z$) of less than 300,000 g/mole. For example, the polyethylene composition may have a z-average molecular weight ($M_z$) from 230,000 to 300,000 g/mole, from 240,000 to 300,000 g/mole, from 250,000 to 300,000 g/mole, from 260,000 to 300,000 g/mole, from 270,000 to 300,000 g/mole, from 230,000 to 290,000 g/mole, from 240,000 to 290,000 g/mole, from 250,000 to 290,000 g/mole, from 260,000 to 290,000 g/mole, from 270,000 to 290,000 g/mole, or any combination of these ranges.

According to one or more additional embodiments, the polyethylene composition may have a zero shear viscosity ratio of less than 2.0. For example, the polyethylene composition may have a zero shear viscosity ratio of less than 1.9, less than 1.8, less than 1.7, less than 1.6, less than 1.5, less than 1.4, less than 1.3, less than 1.2, or even less than 1.1. In one or more embodiments, the polyethylene composition may have a zero shear viscosity ratio of at least 1.0. In embodiments, the polyethylene composition may have a zero shear viscosity ratio of from 1.0 to 2.0, from 1.0 to 1.8, from 1.0 to 1.6, from 1.0 to 1.4, from 1.0 to 1.2, from 1.2 to 2.0, from 1.2 to 1.8, from 1.2 to 1.6, from 1.2 to 1.4, from 1.4 to 2.0, from 1.4 to 1.8, from 1.4 to 1.6, from 1.6 to 2.0, from 1.6 to 1.8, or from 1.8 to 2.0, or any combination of these ranges.

Tan delta (tan δ) refers to a measure of how close a material is to a perfectly-elastic solid (where d=0°, tan delta=0) or of how close a material is to a perfectly-Newtonian liquid (where d=90°, tan delta≈infinity). Thus, lower values of tan d reflect greater elasticity. Tan delta is a function of long chain branching (LCB) and molecular weight distribution (MWD) at the same overall molecular weight. Higher tan delta values indicate lower LCB. In embodiments, the polyethylene composition may have a tan delta at 0.1 radian/sec and 190° C., of from 6 to 100, 6 to 90, 6 to 80, 6 to 70, 6 to 60, 6 to 50, 6 to 40, 6 to 30, 6 to 20, 20 to 100, 20 to 90, 20 to 80, 20 to 70, 20 to 60, 20 to 50, 20 to 40, 20 to 30, 30 to 100, 30 to 90, 30 to 80, 30 to 70, 30 to 60, 30 to 50, 30 to 40, 40 to 100, 40 to 90, 40 to 80, 40 to 70, 40 to 60, 40 to 50, 50 to 100, 50 to 90, 50 to 80, 50 to 70, 50 to 60, 60 to 100, 60 to 90, 60 to 80, 60 to 70, 70 to 100, 70 to 90, 70 to 80, 80 to 100, 80 to 90, or 90 to 100, or any combination of these ranges.

As described herein, a polyethylene "fraction" refers to a portion of the total composition of the polyethylene composition. The presently disclosed embodiments may include at least a "first polyethylene fraction" and a "second polyethylene fraction." Embodiments may also include a "third polyethylene fraction." The various fractions included in the polyethylene composition may be defined by their temperature range in an elution profile via improved comonomers composition distribution (iCCD) analysis method. For example, a polyethylene fraction may be defined by a range from a lower temperature to a higher temperature. It should be understood that two or more polyethylene fractions may overlap with one another. The polyethylene fractions, in one or more embodiments, may generally correlate with peaks or troughs in the iCCD data. In one or more embodiments, a particular polyethylene fraction may include a specified percentage of the total area of the polyethylene composition as defined by the iCCD analysis elution profile. Unless specified, any elution profile referred to herein is the elution profile observed via iCCD. Examples of such fractions will be better understood in view of the examples provided herewith.

In general, the first fraction may include at least one peak in the temperature range of the first fraction. The second fraction may include at least one peak in the temperature range of the second fraction. The polyethylene compositions described herein may be referred to as "multimodal," meaning that they include at least two peaks in their elution profile. In embodiments, the polyethylene compositions described herein may include two peaks ("bimodal"), three peaks ("trimodal"), or more than three peaks in their elution profile. The first polyethylene area fraction, the second polyethylene fraction, and the third polyethylene fraction, respectively, may each include a portion of the total mass of the polyethylene composition.

In reference to the described iCCD distribution, FIG. 1 schematically depicts a sample iCCD distribution 100. FIG. 1 depicts, generally, several features of the iCCD profiles of the presently described polyethylene compositions, such as the first polyethylene fraction, the second fraction, the third polyethylene fraction, etc., which are discussed in detail herein. As such, FIG. 1 can be used as a reference with respect to the disclosures related the iCCD profile provided herein.

Specifically, the first polyethylene fraction 102, the second polyethylene fraction 104, the third polyethylene fraction 106 are depicted. The first polyethylene fraction 102 has a peak 112 and the second polyethylene fraction 104 has a peak 114. It should be understood that the profile of FIG. 1 is not derived from experimentation or observation, but is instead supplied for informational purposes of describing particular features of an iCCD elution profile.

In one or more embodiments, one or more of the first polyethylene fraction and the second polyethylene fraction may have a single peak. As used herein, a "single peak" refers to an iCCD wherein a particular fraction include only one, singular peak. That is, in some embodiments, the iCCD of one or more of the first polyethylene fraction and the second polyethylene fraction includes only an upward sloping region followed by a downward sloping region to form the single peak.

It should be understood that a peak in one or more of the first polyethylene fraction and the second polyethylene fraction may not be formed by a local minimum in the respective polyethylene fraction at a defined temperature boundary. That is, the peak must be a peak in the context of the entire spectrum, not a peak formed by the threshold temperature of a polyethylene fraction. For example, if a single peak followed by a single valley were present in a polyethylene fraction (an upward slope followed by a downward slope followed by an upward slope), only a single peak would be present in such a polyethylene fraction.

In one or more embodiments, the first polyethylene fraction 102 may be an area in the elution profile from 40° C. to 75° C. In additional embodiments, the first polyethylene fraction 102 may be an area in the elution profile in the temperature range of 40° C. to 60° C., 40° C. to 50° C., 40° C. to 70° C., 40° C. to 65° C., 50° C. to 75° C., 50° C. to 70° C., 50° C. to 65° C., 60° C. to 75° C., 60° C. to 70° C., or any combinations in the elution profile via iCCD.

According to one or more embodiments, the first polyethylene fraction area may comprise 45% to 65% of the total area of the elution profile. For example, the first polyethylene fraction area may comprise from 45% to 60%, 45% to 55%, 45% to 50%, 50% to 65%, 50% to 60%, 50% to 55%, 55% to 65%, or any combinations of the total area of the elution profile.

In one or more embodiments, the first polyethylene fraction 102 may have at least one peak 112 in the temperature range of 40° C. to 75° C. in the elution profile via iCCD. In one or more embodiments, the first polyethylene fraction 102 may have at least one peak 112 in the temperature range of 40° C. to 60° C., 40° C. to 50° C., 40° C. to 70° C., 40° C. to 65° C., 50° C. to 75° C., 50° C. to 70° C., 50° C. to 65° C., 60° C. to 75° C., 60° C. to 70° C., or any combinations in the elution profile via iCCD.

In one or more embodiments, the weight average molecular weight ($M_w$) of the first polyethylene fraction may be less than or equal to 150,000 g/mol, such as from 100,000 g/mol to 150,000 g/mol, 110,000 g/mol to 150,000 g/mol, from 120,000 g/mol to 150,000 g/mol, from 100,000 g/mol to 140,000 g/mol, 110,000 g/mol to 140,000 g/mol, from 120,000 g/mol to 140,000 g/mol, or any combination of these ranges. Molecular weight of the polyethylene fractions may be calculated based on iCCD results, as described hereinbelow.

The temperature range of the first polyethylene fraction of 40° C. to 75° C. may be desirable because it may correspond to a low density component of the polyethylene composition. In embodiments, the low density component may provide the low hot tack initiation temperatures, heat seal initiation temperatures, or both. Therefore, increasing the first polyethylene fraction 102, which may include the low density component, may thereby enable the formation of hermetic seal in packages comprising a sealant layer of such resins at a lower sealing temperature.

In one or more embodiments, the second polyethylene fraction 104 may be an area in the elution profile from 85° C. to 110° C. In additional embodiments, the second polyethylene fraction 104 may be an area in the elution profile in the temperature range of 85° C. to 105° C., 85° C. to 100° C., 85° C. to 90° C., 90° C. to 110° C., 90° C. to 105° C., 90° C. to 100° C., 95° C. to 110° C., 95° C. to 105° C., 100° C. to 110° C., or any combinations in the elution profile via iCCD.

According to one or more embodiments, the second polyethylene fraction area may comprise from 15% to 35% of the total area of the elution profile. For example, the second polyethylene fraction area may comprise from 20% to 35%, from 25% to 35%, from 15% to 30%, from 20% to 30%, from 20% to 25%, 15% to 25%, from 15% to 20%, from 20% to 30%, from 20% to 25%, from 25% to 30%, or any combinations of the total area of the elution profile.

In one or more embodiments, the second polyethylene fraction 104 may have at least one peak 114 in the temperature range of 85° C. to 110° C. in the elution profile via iCCD. In one or more embodiments, the second polyethylene fraction 104 may have at least one peak 114 in the temperature range of 85° C. to 105° C., 85° C. to 100° C., 85° C. to 90° C., 90° C. to 110° C., 90° C. to 105° C., 90° C. to 100° C., 95° C. to 110° C., 95° C. to 105° C., 100° C. to 110° C., or any combinations in the elution profile via iCCD.

In one or more embodiments, the weight average molecular weight ($M_w$) of the second polyethylene fraction may be less than or equal to 190,000 g/mol, such as from 95,000 g/mol to 190,000 g/mol, from 100,000 g/mol to 190,000 g/mole, from 105,000 g/mol to 190,000 g/mol, from 110,000 g/mol to 190,000 g/mol, from 95,000 g/mol to 180,000 g/mol, from 100,000 g/mol to 180,000 g/mol, from 105,000 g/mol to 180,000 g/mol, from 110,000 g/mol to 180,000 g/mol, from 95,000 g/mol to 150,000 g/mol, from 100,000 g/mol to 150,000 g/mol, from 105,000 g/mol to 150,000 g/mol, from 110,000 g/mol to 150,000 g/mol, or any combination of these ranges. Molecular weight of the polyethylene fractions may be calculated based on iCCD results, as described hereinbelow.

The temperature range of the second polyethylene fraction of 85° C. to 110° C. may be desirable because it may correspond to a high density component. In embodiments, increasing the high density component may increase the overall density of the polyethylene composition. Therefore, increasing the second polyethylene fraction 104 may thereby increase the high density component and provide a polyethylene composition with a higher overall density. Additionally, increasing the second polyethylene fraction 104 may improve the blocking properties of the polyethylene composition. Without being bound by theory, it is believed that larger crystals form in the high density fraction, which provide a rough surface. The rough surface may reduce the contact area, and therefore improve the blocking properties of the polyethylene composition.

In one or more embodiments, the polyethylene composition may have a local minimum in an elution profile via iCCD in a temperature range of from 75° C. to 85° C. This local minimum may fall between the peak 112 of the first polyethylene fraction 102 and the peak 114 of the second polyethylene fraction 104.

In one or more embodiments, the third polyethylene area fraction 106 may be an area in the elution profile via iCCD from 75° C. to 85° C.

According to one or more embodiments, the third polyethylene fraction area may comprise less than 25% of the total area of the elution profile (for example, less than 23%, less than 22%, or less than 20% of the total area of the elution profile). For example, the third polyethylene fraction area may comprise from 5% to 25%, from 8% to 25%, from 10% to 25%, from 12% to 25% from 15% to 25%, from 5% to 23%, from 8% to 23%, from 10% to 23%, from 12% to 23% from 15% to 23%, or any combinations of the total area of the elution profile.

In one or more embodiments, the weight average molecular weight ($M_w$) of the third polyethylene fraction may be less than or equal to 140,000 g/mol, such as from 80,000 g/mol to 140,000 g/mol, from 85,000 g/mol to 140,000 g/mol, from 90,000 g/mol to 140,000 g/mol, from 95,000 g/mol to 140,000 g/mol, from 100,000 g/mol to 140,000 g/mol, from 85,000 g/mol to 130,000 g/mol, from 90,000 g/mol to 130,000 g/mol, from 95,000 g/mol to 130,000 g/mol, from 100,000 g/mol to 130,000 g/mol, from 85,000 g/mol to 125,000 g/mol, from 90,000 g/mol to 125,000 g/mol, from 95,000 g/mol to 125,000 g/mol, from 100,000 g/mol to 125,000 g/mol, or any combination of these ranges. Molecular weight of the polyethylene fractions may be calculated based on iCCD results, as described hereinbelow.

In various embodiments, the ratio of the weight average molecular weight ($M_w$) of the polyethylene composition in the various polyethylene fractions can be important. In one or more embodiments, the ratio of the Mw in the first polyethylene fraction (40° C. to 75° C.) to the $M_w$ in the third polyethylene fraction (75° C. to 85° C.) (i.e., the $M_w$ of the first polyethylene fraction divided by the $M_w$ of the third polyethylene fraction) is from 0.90 to 1.6. For example, the ratio of the $M_w$ in the first polyethylene fraction (40° C. to 75° C.) to the $M_w$ in the third polyethylene fraction (75° C. to 85° C.) (i.e., the $M_w$ of the first polyethylene fraction divided by the $M_w$ of the third polyethylene fraction) may be from 1.0 to 1.6, from 1.1 to 1.6, from 1.2 to 1.6, from 0.90 to 1.5, from 1.0 to 1.5, from 1.1 to 1.5, from 1.2 to 1.5, from 0.90 to 1.4, from 1.0 to 1.4, from 1.1 to 1.4, or any combination of these ranges.

In one or more embodiments, the ratio of the $M_w$ in the third polyethylene fraction (75° C. to 85° C.) to the $M_w$ in the second polyethylene fraction (85° C. to 110° C.) (i.e., the $M_w$ of the third polyethylene fraction divided by the $M_w$ of the second polyethylene fraction) is from 0.50 to 1.5. For example, the ratio of the $M_w$ in the third polyethylene fraction (75° C. to 85° C.) to the $M_w$ in the second polyethylene fraction (85° C. to 110° C.) (i.e., the $M_w$ of the third polyethylene fraction divided by the $M_w$ of the second polyethylene fraction) may be from 0.50 to 1.4, from 0.50 to 1.3, from 0.50 to 1.2, from 0.50 to 1.1, from 0.50 to 1.0, from 0.50 to 0.90, 0.60 to 1.4, from 0.60 to 1.3, from 0.60 to 1.2, from 0.60 to 1.1, from 0.60 to 1.0, from 0.60 to 0.90, from 0.70 to 1.4, from 0.70 to 1.3, from 0.70 to 1.2, from 0.70 to 1.1, from 0.70 to 1.0, from 0.70 to 0.90, or any combination of these ranges.

In one or more embodiments, the polyethylene composition is formed from the polymerization of ethylene and comonomers such as a C3-C12 alkene. Contemplated comonomers include C6-C9 alkenes, such as 1-octene and 1-hexene. In one or more embodiments the comonomers is 1-octene.

In one or more embodiments, the presently-disclosed polyethylene compositions may further comprise additional components such as one or more additives. Such additives include, but are not limited to, antistatic agents, color enhancers, dyes, lubricants, fillers such as $TiO_2$ or $CaCO_3$, opacifiers, nucleators, processing aids, pigments, primary anti-oxidants, secondary anti-oxidants, UV stabilizers, anti-blocks, slip agents, tackifiers, fire retardants, anti-microbial agents, odor reducer agents, anti-fungal agents, and combinations thereof. The polyethylene compositions may contain from about 0.1 to about 10 percent by the combined weight of such additives, based on the weight of the polyethylene composition including such additives.

Polymerization

Any conventional polymerization processes may be employed to produce the polyethylene compositions described herein. Such conventional polymerization processes include, but are not limited to, gas phase polymerization processes, slurry polymerization processes, solution polymerization process, using one or more conventional reactors, e.g., loop reactors, isothermal reactors, stirred tank reactors, pipe flow reactors, plug flow reactors, batch reactors in parallel, series, and/or any combinations thereof. The polyethylene composition may, for example, be produced via solution phase polymerization process using one or more loop reactors, isothermal reactors, and combinations thereof.

In general, the solution phase polymerization process may occur in one or more well-mixed reactors such as one or more isothermal loop reactors or one or more adiabatic reactors at a temperature in the range of from 115° C. to 250° C. (e.g., from 115° C. to 210° C.), and at pressures in the range of from 300 psi to 3,000 psi (e.g., from 400 psi to 800 psi). In some embodiments, in a dual reactor, the temperature in the first reactor is in the range of from 115° C. to 190° C. (e.g., from 150° C. to 180° C.), and the second reactor temperature is in the range of 150° C. to 250° C. (e.g., from 180° C. to 220° C.). In other embodiments, in a single reactor, the temperature in the reactor is in the range of from 115 to 250° C. (e.g., from 115° C. to 225° C.).

The residence time in solution phase polymerization process may be in the range of from 2 minutes to 30 minutes (e.g., from 5 minutes to 25 minutes). Ethylene, solvent, hydrogen, one or more catalyst systems, optionally one or more cocatalysts, and optionally one or more comonomers are fed continuously to one or more reactors. Exemplary solvents include, but are not limited to, isoparaffins. For example, such solvents are commercially available under the name ISOPAR E from ExxonMobil Chemical Co., Houston, Texas. The resultant mixture of the polyethylene composition and solvent is then removed from the reactor and the polyethylene composition is isolated. Solvent is typically recovered via a solvent recovery unit, e.g., heat exchangers and vapor liquid separator drum, and is then recycled back into the polymerization system.

In some embodiments, the polyethylene composition may be produced via solution polymerization in a dual reactor system, for example a dual loop reactor system, wherein ethylene is polymerized in the presence of one or more catalyst systems and one or more comonomers. Additionally, one or more cocatalysts may be present. In another embodiment, the polyethylene composition may be produced via solution polymerization in a dual reactor system, for example a single loop reactor followed by an adiabatic continuously stirred tank reactor (CSTR), wherein ethylene is polymerized in the presence of one or more catalyst systems and one or more comonomers. In another embodiment, the polyethylene composition may be produced via solution polymerization in a single reactor system, for example a single loop reactor system, wherein ethylene is polymerized in the presence of two catalyst systems and one or more comonomers Catalyst Systems Specific embodiments of catalyst systems that can, in one or more embodiments, be used to produce the polyethylene compositions described herein will now be described. It should be understood that the catalyst systems of this disclosure may be embodied in different forms and should not be construed as limited to the specific embodiments set forth in this disclosure. Rather, embodiments are provided so that this disclosure will be thorough and complete, and will fully convey the scope of the subject matter to those skilled in the art. Without being bound by theory, it is believed that the catalyst systems produce a mixture of a low density component in the temperature range of 40° C. to 75° C. in an elution profile via iCCD analysis method, which may therefore allow the polyethylene composition to achieve the desired hot tack initiation temperature, heat seal initiation temperature or both, and a high density component in the temperature range of 85° C. to 110° C. in an elution profile via iCCD analysis method, which may therefore allow the polyethylene composition to achieve the desired blocking properties.

The term "independently selected" is used herein to indicate that the R groups, such as, $R^1$, $R^2$, $R^3$, $R^4$, and $R^5$ can be identical or different (e.g., $R^1$, $R^2$, $R^3$, $R^4$, and $R^5$ may all be substituted alkyls or $R^1$ and $R^2$ may be a substituted alkyl and $R^3$ may be an aryl, etc.). Use of the singular includes use of the plural and vice versa (e.g., a hexane solvent, includes hexanes). A named R group will generally have the structure that is recognized in the art as corresponding to R groups having that name. These definitions are intended to supplement and illustrate, not preclude, the definitions known to those of skill in the art.

The term "procatalyst" refers to a compound that has catalytic activity when combined with an activator. The term "activator" refers to a compound that chemically reacts with a procatalyst in a manner that converts the procatalyst to a catalytically active catalyst. As used herein, the terms "co-catalyst" and "activator" are interchangeable terms.

When used to describe certain carbon atom-containing chemical groups, a parenthetical expression having the form "$(C_x-C_y)$" means that the unsubstituted form of the chemical group has from x carbon atoms to y carbon atoms, inclusive of x and y. For example, a $(C_1-C_{40})$alkyl is an alkyl group having from 1 to 40 carbon atoms in its unsubstituted form. In some embodiments and general structures, certain chemical groups may be substituted by one or more substituents such as $R^S$. An $R^S$ substituted version of a chemical group defined using the "$(C_x-C_y)$" parenthetical may contain more than y carbon atoms depending on the identity of any groups $R^S$. For example, a "$(C_1-C_{40})$alkyl substituted with exactly one group $R^S$, where $R^S$ is phenyl ($—C_6H_5$)" may contain from 7 to 46 carbon atoms. Thus, in general when a chemical group defined using the "$(C_x-C_y)$" parenthetical is substituted by one or more carbon atom-containing substituents $R^S$, the minimum and maximum total number of carbon atoms of the chemical group is determined by adding to both x and y the combined sum of the number of carbon atoms from all of the carbon atom-containing substituents $R^S$.

The term "substitution" means that at least one hydrogen atom (—H) bonded to a carbon atom or heteroatom of a corresponding unsubstituted compound or function group is replaced by a substituent (e.g. $R^S$). The term "persubstitution" means that every hydrogen atom (H) bonded to a carbon atom or heteroatom of a corresponding unsubstituted compound or functional group is replaced by a substituent (e.g., $R^S$). The term "polysubstitution" means that at least two, but fewer than all, hydrogen atoms bonded to carbon atoms or heteroatoms of a corresponding unsubstituted compound or functional group are replaced by a substituent.

The term "—H" means a hydrogen or hydrogen radical that is covalently bonded to another atom. "Hydrogen" and "—H" are interchangeable, and unless clearly specified mean the same thing.

The term "$(C_1-C_{40})$hydrocarbyl" means a hydrocarbon radical of from 1 to 40 carbon atoms and the term "$(C_1-C_{40})$hydrocarbylene" means a hydrocarbon diradical of from 1 to 40 carbon atoms, in which each hydrocarbon radical and each hydrocarbon diradical is aromatic or non-aromatic, saturated or unsaturated, straight chain or branched chain, cyclic (including mono- and poly-cyclic, fused and non-fused polycyclic, including bicyclic; 3 carbon atoms or more) or acyclic and is unsubstituted or substituted by one or more $R^S$.

In this disclosure, a $(C_1-C_{40})$hydrocarbyl can be an unsubstituted or substituted $(C_1-C_{40})$alkyl, $(C_3-C_{40})$cycloalkyl, $(C_3-C_{20})$cycloalkyl-$(C_1-C_{20})$alkylene, $(C_6-C_{40})$aryl, or $(C_6-C_{20})$aryl-$(C_1-C_{20})$alkylene. In some embodiments, each of the aforementioned $(C_1-C_{40})$hydrocarbyl groups has a maximum of 20 carbon atoms (i.e., $(C_1-C_{20})$hydrocarbyl) and other embodiments, a maximum of 12 carbon atoms.

The terms "$(C_1-C_{40})$alkyl" and "$(C_1-C_{18})$alkyl" mean a saturated straight or branched hydrocarbon radical of from 1 to 40 carbon atoms or from 1 to 18 carbon atoms, respectively, that is unsubstituted or substituted by one or more $R^S$. Examples of unsubstituted $(C_1-C_{40})$alkyl are unsubstituted $(C_1-C_{20})$alkyl; unsubstituted $(C_1-C_{10})$alkyl; unsubstituted $(C_1-C_5)$alkyl; methyl; ethyl; 1-propyl; 2-propyl; 1-butyl; 2-butyl; 2-methylpropyl; 1,1-dimethylethyl; 1-pentyl; 1-hexyl; 1-heptyl; 1-nonyl; and 1-decyl. Examples of substituted $(C_1-C_{40})$alkyl are substituted $(C_1-C_{20})$alkyl, substituted $(C_1-C_{10})$alkyl, trifluoromethyl, and $[C_{45}]$alkyl. The term "$[C_{45}]$alkyl" (with square brackets) means there is a maximum of 45 carbon atoms in the radical, including substituents, and is, for example, a $(C_{27}-C_{40})$alkyl substituted by one $R^S$, which is a $(C_1-C_5)$alkyl, respectively. Each $(C_1-C_5)$alkyl may be methyl, trifluoromethyl, ethyl, 1-propyl, 1-methylethyl, or 1,1-dimethylethyl.

The term "$(C_6-C_{40})$aryl" means an unsubstituted or substituted (by one or more $R^S$) mono-, bi- or tricyclic aromatic hydrocarbon radical of from 6 to 40 carbon atoms, of which at least from 6 to 14 of the carbon atoms are aromatic ring carbon atoms, and the mono-, bi- or tricyclic radical comprises 1, 2, or 3 rings, respectively; wherein the 1 ring is aromatic and the 2 or 3 rings independently are fused or non-fused and at least one of the 2 or 3 rings is aromatic. Examples of unsubstituted $(C_6-C_{40})$aryl are unsubstituted $(C_6-C_{20})$aryl unsubstituted $(C_6-C_{15})$aryl; 2-$(C_1-C_5)$alkyl-phenyl; 2,4-bis$(C_1-C_5)$alkyl-phenyl; phenyl; fluorenyl; tetrahydrofluorenyl; indacenyl; hexahydroindacenyl; indenyl; dihydroindenyl; naphthyl; tetrahydronaphthyl; and phenanthrene. Examples of substituted $(C_6-C_{40})$aryl are substituted $(C_1-C_{20})$aryl; substituted $(C_6-C_{15})$aryl; 2,4-bis[$(C_{20})$alkyl]-phenyl; polyfluorophenyl; pentafluorophenyl; and fluoren-9-one-1-yl.

The term "$(C_3-C_{40})$cycloalkyl" means a saturated cyclic hydrocarbon radical of from 3 to 40 carbon atoms that is unsubstituted or substituted by one or more $R^S$. Other cycloalkyl groups (e.g., $(C_x-C_y)$cycloalkyl) are defined in an analogous manner as having from x to y carbon atoms and being either unsubstituted or substituted with one or more $R^S$. Examples of unsubstituted $(C_3-C_{40})$cycloalkyl are unsubstituted $(C_3-C_{20})$cycloalkyl, unsubstituted $(C_3-C_{10})$cycloalkyl, cyclopropyl, cyclobutyl, cyclopentyl, cyclohexyl, cycloheptyl, cyclooctyl, cyclononyl, and cyclodecyl. Examples of substituted $(C_3-C_{40})$cycloalkyl are substituted ($C_3$-$C_{20}$)cycloalkyl, substituted ($C_3$-$C_{10}$)cycloalkyl, cyclopentanon-2-yl, and 1-fluorocyclohexyl.

Examples of ($C_1$-$C_{40}$)hydrocarbylene include unsubstituted or substituted ($C_6$-$C_{40}$)arylene, ($C_3$-$C_{40}$)cycloalkylene, and ($C_1$-$C_{40}$)alkylene (e.g., ($C_1$-$C_{20}$)alkylene). In some embodiments, the diradicals are on the same carbon atom (e.g., —$CH_2$—) or on adjacent carbon atoms (i.e., 1,2-diradicals), or are spaced apart by one, two, or more than two intervening carbon atoms (e.g., respective 1,3-diradicals, 1,4-diradicals, etc.). Some diradicals include α,ω-diradical. The α,ω-diradical is a diradical that has maximum carbon backbone spacing between the radical carbons. Some examples of ($C_2$-$C_{20}$)alkylene α,ω-diradicals include ethan-1,2-diyl (i.e. —$CH_2CH_2$—), propan-1,3-diyl (i.e. —$CH_2CH_2CH_2$—), 2-methylpropan-1,3-diyl (i.e. —$CH_2CH(CH_3)CH_2$—). Some examples of ($C_6$-$C_{50}$)arylene α,ω-diradicals include phenyl-1,4-diyl, napthalen-2,6-diyl, or napthalen-3,7-diyl.

The term "($C_1$-$C_{40}$)alkylene" means a saturated straight chain or branched chain diradical (i.e., the radicals are not on ring atoms) of from 1 to 40 carbon atoms that is unsubstituted or substituted by one or more $R^S$. Examples of unsubstituted ($C_1$-$C_{50}$)alkylene are unsubstituted ($C_1$-$C_{20}$)alkylene, including unsubstituted —$CH_2CH_2$—, —$(CH_2)_3$—, —$(CH_2)_4$—, —$(CH_2)_5$—, —$(CH_2)_6$—, —$(CH_2)_7$—, —$(CH_2)_8$—, —$CH_2C^*HCH_3$, and —$(CH_2)_4C^*(H)(CH_3)$—, in which "C*" denotes a carbon atom from which a hydrogen atom is removed to form a secondary or tertiary alkyl radical. Examples of substituted ($C_1$-$C_{50}$)alkylene are substituted ($C_1$-$C_{20}$)alkylene, —$CF_2$—, —$C(O)$—, and —$(CH_2)_{14}C(CH_3)_2(CH_2)_5$— (i.e., a 6,6-dimethyl substituted normal-1,20-eicosylene). Since as mentioned previously two $R^S$ may be taken together to form a ($C_1$-$C_{18}$)alkylene, examples of substituted ($C_1$-$C_{50}$)alkylene also include 1,2-bis(methylene)cyclopentane, 1,2-bis(methylene)cyclohexane, 2,3-bis(methylene)-7,7-dimethyl-bicyclo[2.2.1]heptane, and 2,3-bis (methylene)bicyclo [2.2.2] octane.

The term "($C_3$-$C_{40}$)cycloalkylene" means a cyclic diradical (i.e., the radicals are on ring atoms) of from 3 to 40 carbon atoms that is unsubstituted or substituted by one or more $R^S$.

The term "heteroatom," refers to an atom other than hydrogen or carbon. Examples of heteroatoms include O, S, S(O), $S(O)_2$, $Si(R^C)_2$, $P(R^P)$, $N(R^N)$, —N=$C(R^C)_2$, —Ge$(R^C)_2$—, or —$Si(R^C)$—, where each $R^C$, each $R^N$, and each $R^P$ is unsubstituted ($C_1$-$C_{18}$)hydrocarbyl or —H. The term "heterohydrocarbon" refers to a molecule or molecular framework in which one or more carbon atoms are replaced with a heteroatom. The term "($C_1$-$C_{40}$)heterohydrocarbyl" means a heterohydrocarbon radical of from 1 to 40 carbon atoms and the term "($C_1$-$C_{40}$)heterohydrocarbylene" means a heterohydrocarbon diradical of from 1 to 40 carbon atoms, and each heterohydrocarbon has one or more heteroatoms. The radical of the heterohydrocarbyl is on a carbon atom or a heteroatom, and diradicals of the heterohydrocarbyl may be on: (1) one or two carbon atom, (2) one or two heteroatoms, or (3) a carbon atom and a heteroatom. Each ($C_1$-$C_{50}$)heterohydrocarbyl and ($C_1$-$C_{50}$)heterohydrocarbylene may be unsubstituted or substituted (by one or more $R^S$), aromatic or non-aromatic, saturated or unsaturated, straight chain or branched chain, cyclic (including mono- and polycyclic, fused and non-fused polycyclic), or acyclic.

The ($C_1$-$C_{40}$)heterohydrocarbyl may be unsubstituted or substituted ($C_1$-$C_{40}$)heteroalkyl, ($C_1$-$C_{40}$)hydrocarbyl-O—, ($C_1$-$C_{40}$)hydrocarbyl-S—, ($C_1$-$C_{40}$)hydrocarbyl-S(O)—, ($C_1$-$C_{40}$)hydrocarbyl-$S(O)_2$—, ($C_1$-$C_{40}$)hydrocarbyl-$Si(R^C)_2$—, ($C_1$-$C_{40}$)hydrocarbyl-$N(R^N)$—, ($C_1$-$C_{40}$)hydrocarbyl-$P(R^P)$—, ($C_2$-$C_{40}$)heterocycloalkyl, ($C_2$-$C_{19}$)heterocycloalkyl-($C_1$-$C_{20}$)alkylene, ($C_3$-$C_{20}$)cycloalkyl-($C_1$-$C_{19}$)heteroalkylene, ($C_2$-$C_{19}$)heterocycloalkyl-($C_1$-$C_{20}$)heteroalkylene, ($C_1$-$C_{40}$)heteroaryl, ($C_1$-$C_{19}$)heteroaryl-($C_1$-$C_{20}$)alkylene, ($C_6$-$C_{20}$)aryl-($C_1$-$C_{19}$)heteroalkylene, or ($C_1$-$C_{19}$)heteroaryl-($C_1$-$C_{20}$)heteroalkylene.

The term "($C_3$-$C_{40}$)heteroaryl" means an unsubstituted or substituted (by one or more $R^S$) mono-, bi- or tricyclic heteroaromatic hydrocarbon radical of from 4 to 40 total carbon atoms and from 1 to 10 heteroatoms, and the mono-, bi- or tricyclic radical comprises 1, 2 or 3 rings, respectively, wherein the 2 or 3 rings independently are fused or non-fused and at least one of the 2 or 3 rings is heteroaromatic. Other heteroaryl groups (e.g., ($C_x$-$C_y$)heteroaryl generally, such as ($C_4$-$C_{12}$)heteroaryl) are defined in an analogous manner as having from x to y carbon atoms (such as 4 to 12 carbon atoms) and being unsubstituted or substituted by one or more than one $R^S$. The monocyclic heteroaromatic hydrocarbon radical is a 5-membered or 6-membered ring. The 5-membered ring has 5 minus h carbon atoms, wherein h is the number of heteroatoms and may be 1, 2, or 3; and each heteroatom may be O, S, N, or P. Examples of 5-membered ring heteroaromatic hydrocarbon radical are pyrrol-1-yl; pyrrol-2-yl; furan-3-yl; thiophen-2-yl; pyrazol-1-yl; isoxazol-2-yl; isothiazol-5-yl; imidazol-2-yl; oxazol-4-yl; thiazol-2-yl; 1,2,4-triazol-1-yl; 1,3,4-oxadiazol-2-yl; 1,3,4-thiadiazol-2-yl; tetrazol-1-yl; tetrazol-2-yl; and tetrazol-5-yl. The 6-membered ring has 6 minus h carbon atoms, wherein h is the number of heteroatoms and may be 1 or 2 and the heteroatoms may be N or P. Examples of 6-membered ring heteroaromatic hydrocarbon radical are pyridine-2-yl; pyrimidin-2-yl; and pyrazin-2-yl. The bicyclic heteroaromatic hydrocarbon radical can be a fused 5,6- or 6,6-ring system. Examples of the fused 5,6-ring system bicyclic heteroaromatic hydrocarbon radical are indol-1-yl; and benzimidazole-1-yl. Examples of the fused 6,6-ring system bicyclic heteroaromatic hydrocarbon radical are quinolin-2-yl; and isoquinolin-1-yl. The tricyclic heteroaromatic hydrocarbon radical can be a fused 5,6,5-; 5,6,6-; 6,5,6-; or 6,6,6-ring system. An example of the fused 5,6,5-ring system is 1,7-dihydropyrrolo[3,2-f]indol-1-yl. An example of the fused 5,6,6-ring system is 1H-benzo[f]indol-1-yl. An example of the fused 6,5,6-ring system is 9H-carbazol-9-yl. An example of the fused 6,5,6-ring system is 9H-carbazol-9-yl. An example of the fused 6,6,6-ring system is acrydin-9-yl.

The aforementioned heteroalkyl may be saturated straight or branched chain radicals containing ($C_1$-$C_{50}$) carbon atoms, or fewer carbon atoms and one or more of the heteroatoms. Likewise, the heteroalkylene may be saturated straight or branched chain diradicals containing from 1 to 50 carbon atoms and one or more than one heteroatoms. The heteroatoms, as defined above, may include $Si(R^C)_3$, $Ge(R^C)_3$, $Si(R^C)_2$, $Ge(R^C)_2$, $P(R^P)_2$, $P(R^P)$, $N(R^N)_2$, $N(R^N)$, N, O, $OR^C$, S, $SR^C$, S(O), and $S(O)_2$, wherein each of the heteroalkyl and heteroalkylene groups are unsubstituted or substituted by one or more $R^S$.

Examples of unsubstituted ($C_2$-$C_{40}$)heterocycloalkyl are unsubstituted ($C_2$-$C_{20}$)heterocycloalkyl, unsubstituted ($C_2$-$C_{10}$)heterocycloalkyl, aziridin-1-yl, oxetan-2-yl, tetrahydrofuran-3-yl, pyrrolidin-1-yl, tetrahydrothiophen-S,S-dioxide-2-yl, morpholin-4-yl, 1,4-dioxan-2-yl, hexahydroazepin-4-yl, 3-oxa-cyclooctyl, 5-thio-cyclononyl, and 2-aza-cyclodecyl.

The term "halogen atom" or "halogen" means the radical of a fluorine atom (F), chlorine atom (Cl), bromine atom (Br), or iodine atom (I). The term "halide" means anionic form of the halogen atom: fluoride ($F^-$), chloride ($Cl^-$), bromide ($Br^-$), or iodide ($I^-$).

The term "saturated" means lacking carbon-carbon double bonds, carbon-carbon triple bonds, and (in heteroatom-containing groups) carbon-nitrogen, carbon-phosphorous, and carbon-silicon double bonds. Where a saturated chemical group is substituted by one or more substituents $R^S$, one or more double and/or triple bonds optionally may or may not be present in substituents $R^S$. The term "unsaturated" means containing one or more carbon-carbon double bonds, carbon-carbon triple bonds, and (in heteroatom-containing groups) carbon-nitrogen, carbon-phosphorous, and carbon-silicon double bonds, not including any such double bonds that may be present in substituents $R^S$, if any, or in (hetero) aromatic rings, if any.

According to some embodiments, a catalyst system for producing a polyethylene composition includes a metal-ligand complex according to formula (I):

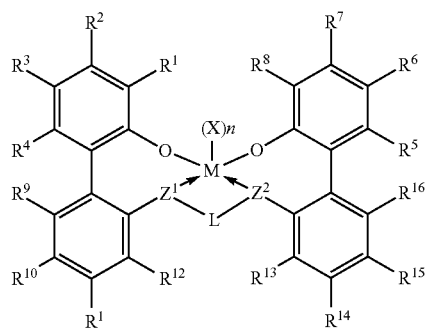
(I)

In formula (I), M is a metal chosen from titanium, zirconium, or hafnium, the metal being in a formal oxidation state of +2, +3, or +4; n is 0, 1, or 2; when n is 1, X is a monodentate ligand or a bidentate ligand; when n is 2, each X is a monodentate ligand and is the same or different; the metal-ligand complex is overall charge-neutral; each Z is independently chosen from —O—, —S—, —N($R^N$)—, or —P($R^P$)—; L is ($C_1$-$C_{40}$)hydrocarbylene or ($C_1$-$C_{40}$) heterohydrocarbylene, wherein the ($C_1$-$C_{40}$) hydrocarbylene has a portion that comprises a 1-carbon atom to 10-carbon atom linker backbone linking the two Z groups in Formula (I) (to which L is bonded) or the ($C_1$-$C_{40}$) heterohydrocarbylene has a portion that comprises a 1-atom to 10-atom linker backbone linking the two Z groups in Formula (I), wherein each of the 1 to 10 atoms of the 1-atom to 10-atom linker backbone of the ($C_1$-$C_{40}$) heterohydrocarbylene independently is a carbon atom or heteroatom, wherein each heteroatom independently is O, S, S(O), S(O)$_2$, Si($R^C$)$_2$, Ge($R^C$)$_2$, P($R^C$), or N($R^C$), wherein independently each $R^C$ is ($C_1$-$C_{30}$) hydrocarbyl or ($C_1$-$C_{30}$) heterohydrocarbyl; $R^1$ and $R^8$ are independently selected from the group consisting of —H, ($C_1$-$C_{40}$) hydrocarbyl, ($C_1$-$C_{40}$) heterohydrocarbyl, —Si($R^C$)$_3$, —Ge($R^C$)$_3$, —P($R^P$)$_2$, —N($R^N$)$_2$, —O$R^C$, —S$R^C$, —NO$_2$, —CN, —CF$_3$, $R^C$S(O)—, $R^C$S(O)$_2$—, ($R^C$)$_2$C=N—, $R^C$C(O)O—, $R^C$OC(O)—, $R^C$C(O)N($R^N$)—, ($R^N$)$_2$NC(O)—, halogen.

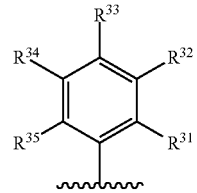
(II)

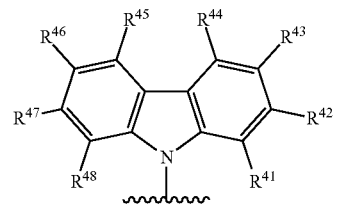
(III)

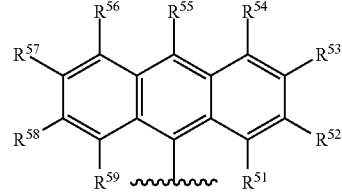
(IV)

In formula (I), each of $R^{2-4}$, $R^{5-7}$, and $R^{9-16}$ is independently selected from ($C_1$-$C_{40}$)hydrocarbyl, ($C_1$-$C_{40}$)heterohydrocarbyl, —Si($R^C$)$_3$, —Ge($R^C$)$_3$, —P($R^P$)$_2$, —N($R^N$)$_2$, —N=CHR$^C$, —OR$^C$, —SR$^C$, —NO$_2$, —CN, —CF$_3$, RCS(O)—, RCS(O)$_2$—, ($R^C$)$_2$C=N—, RCC(O)O—, RCOC(O)—, RCC(O)N($R^N$)—, ($R^C$)$_2$NC(O)—, halogen, and —H.

In one exemplary embodiment where a dual loop reactor is used, the procatalyst used in the first loop is zirconium, [[2,2'''-[[bis[1-methylethyl]germylene]bis(methyleneoxy-κO)]bis[3'',5,5''-tris(1,1-dimethylethyl)-5'-octyl[1,1':3',1''-terphenyl]-2'-olato-κO]](2-)]dimethyl-, having the chemical formula C$_{86}$H$_{128}$F$_2$GeO$_4$Zr and the following structure (V):

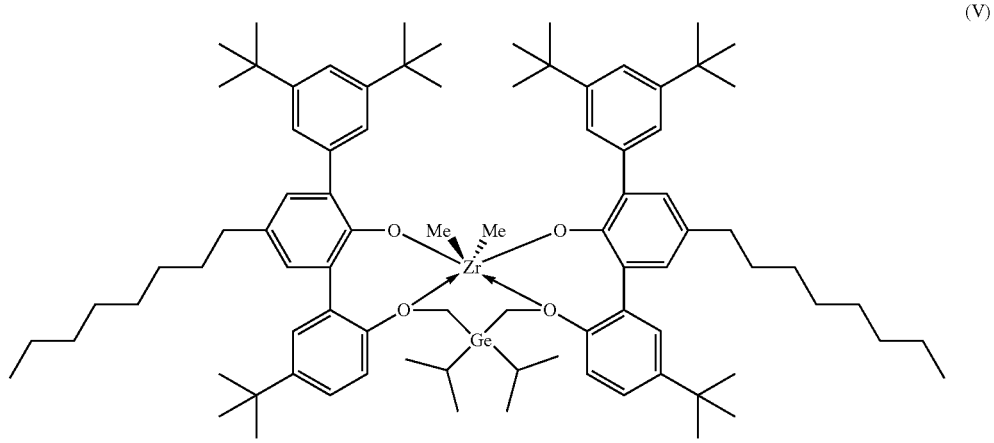
(V)

In some embodiments, the polyethylene composition is formed using a first catalyst according to formula (I) in a first reactor and a Ziegler-Natta catalyst in a second reactor.

The Ziegler-Natta catalysts suitable for use in the second reactor to make embodiments of polyethylene composition are typical supported, Ziegler-type catalysts, which are particularly useful at the high polymerization temperatures of the solution process. Examples of such compositions are those derived from organomagnesium compounds, alkyl halides or aluminum halides or hydrogen chloride, and a transition metal compound. Examples of such catalysts are described in U.S. Pat. Nos. 4,612,300; 4,314,912; and 4,547,475; the teachings of which are incorporated herein by reference.

Particularly suitable organomagnesium compounds include, for example, hydrocarbon soluble dihydrocarbylmagnesium, such as the magnesium dialkyls and the magnesium diaryls. Exemplary suitable magnesium dialkyls include, particularly, n-butyl-sec-butylmagnesium, diisopropylmagnesium, di-n-hexylmagnesium, isopropyl-n-butylmagnesium, ethyl-n-hexyl-magnesium, ethyl-n-butylmagnesium, di-n-octylmagnesium, and others, wherein the alkyl has from 1 to 20 carbon atoms. Exemplary suitable magnesium diaryls include diphenylmagnesium, dibenzylmagnesium and ditolylmagnesium. Suitable organomagnesium compounds include alkyl and aryl magnesium alkoxides and aryloxides and aryl and alkyl magnesium halides, with the halogen-free organomagnesium compounds being more desirable.

Halide sources include active non-metallic halides, metallic halides, and hydrogen chloride. Suitable non-metallic halides are represented by the formula R'X, wherein R' is hydrogen or an active monovalent organic radical, and X is a halogen. Particularly suitable non-metallic halides include, for example, hydrogen halides and active organic halides, such as t-alkyl halides, allyl halides, benzyl halides and other active hydrocarbyl halides. By an active organic halide is meant a hydrocarbyl halide that contains a labile halogen at least as active, i.e., as easily lost to another compound, as the halogen of sec-butyl chloride, preferably as active as t-butyl chloride. In addition to the organic monohalides, it is understood that organic dihalides, trihalides and other polyhalides that are active, as defined hereinbefore, are also suitably employed. Examples of preferred active non-metallic halides, include hydrogen chloride, hydrogen bromide, t-butyl chloride, t-amyl bromide, allyl chloride, benzyl chloride, crotyl chloride, methylvinyl carbinyl chloride, a-phenylethyl bromide, diphenyl methyl chloride, and the like. Most preferred are hydrogen chloride, t-butyl chloride, allyl chloride and benzyl chloride.

Suitable metallic halides include those represented by the formula MRy-a Xa, wherein: M is a metal of Groups IIB, IIIA or IVA of Mendeleev's periodic Table of Elements; R is a monovalent organic radical; X is a halogen; y has a value corresponding to the valence of M; and "a" has a value from 1 to y. Preferred metallic halides are aluminum halides of the formula $AlR_{3-a}X_a$, wherein each R is independently hydrocarbyl, such as alkyl; X is a halogen; and a is a number from 1 to 3. Most preferred are alkylaluminum halides, such as ethylaluminum sesquichloride, diethylaluminum chloride, ethylaluminum dichloride, and diethylaluminum bromide, with ethylaluminum dichloride being especially preferred. Alternatively, a metal halide, such as aluminum trichloride, or a combination of aluminum trichloride with an alkyl aluminum halide, or a trialkyl aluminum compound may be suitably employed.

Any of the conventional Ziegler-Natta transition metal compounds can be usefully employed, as the transition metal component in preparing the supported catalyst component. Typically, the transition metal component is a compound of a Group IVB, VB, or VIB metal. The transition metal component is generally, represented by the formulas: $TrX'_{4-q}(OR1)q$, $TrX'_{4-q}$, and $(R^2)q$.

Tr is a Group IVB, VB, or VIB metal, preferably a Group IVB or VB metal, preferably titanium, vanadium or zirconium; q is 0 or a number equal to, or less than, 4; X' is a halogen, and R1 is an alkyl group, aryl group or cycloalkyl group having from 1 to 20 carbon atoms; and R2 is an alkyl group, aryl group, aryl-alkyl group, substituted aralkyls, and the like.

The aryl, aralkyls and substituted aralkys contain 1 to 20 carbon atoms, preferably 1 to 10 carbon atoms. When the transition metal compound contains a hydrocarbyl group, R2, being an alkyl, cycloalkyl, aryl, or aralkyl group, the hydrocarbyl group will preferably not contain an H atom in the position beta to the metal carbon bond. Illustrative, but non-limiting, examples of aralkyl groups are methyl, neopentyl, 2,2-dimethylbutyl, 2,2-dimethylhexyl; aryl groups such as benzyl; cycloalkyl groups such as 1-norbornyl. Mixtures of these transition metal compounds can be employed if desired.

Illustrative examples of the transition metal compounds include $TiCl_4$, $TiBr_4$, $Ti(OC_2H_5)_3Cl$, $Ti(OC_2H_5)Cl_3$, $Ti(OC_4H_9)_3Cl$, $Ti(OC_3H_7)_2Cl_2$, $Ti(OC_6H_{13})_2Cl_2$, $Ti(OC_8H_{17})_2Br_2$, and $Ti(OC_{12}H_{25})C_{13}$, $Ti(O-iC_3H_7)_4$, and $Ti(O-nC_4H_9)_4$. Illustrative examples of vanadium compounds include $VCl_4$, $VOCl_3$, $VO(OC_2H_5)_3$, and $VO(OC_4H_9)_3$. Illustrative examples of zirconium compounds include $ZrCl_4$, $ZrCl_3(OC_2H_5)$, $ZrCl_2(OC_2H_5)_2$, $ZrCl(OC_2H_5)_3$, $Zr(OC_2H_5)_4$, $ZrCl_3(OC_4H_9)$, $ZrCl_2(OC_4H_9)_2$, and $ZrCl(OC_4H_9)_3$.

An inorganic oxide support may be used in the preparation of the catalyst, and the support may be any particulate oxide, or mixed oxide which has been thermally or chemically dehydrated, such that it is substantially free of adsorbed moisture. See U.S. Pat. Nos. 4,612,300; 4,314,912; and 4,547,475; the teachings of which are incorporated herein by reference.

Co-Catalyst Component

The catalyst system comprising a metal-ligand complex of formula (I) may be rendered catalytically active by any technique known in the art for activating metal-based catalysts of olefin polymerization reactions. For example, the system comprising a metal-ligand complex of formula (I) may be rendered catalytically active by contacting the complex to, or combining the complex with, an activating co-catalyst. Suitable activating co-catalysts for use herein include alkyl aluminums; polymeric or oligomeric alumoxanes (also known as aluminoxanes); neutral Lewis acids; and non-polymeric, non-coordinating, ion-forming compounds (including the use of such compounds under oxidizing conditions). A suitable activating technique is bulk electrolysis. Combinations of one or more of the foregoing activating co-catalysts and techniques are also contemplated. The term "alkyl aluminum" means a monoalkyl aluminum dihydride or monoalkylaluminum dihalide, a dialkyl aluminum hydride or dialkyl aluminum halide, or a trialkylaluminum. Examples of polymeric or oligomeric alumoxanes include methylalumoxane, triisobutylaluminum-modified methylalumoxane, and isobutylalumoxane.

Lewis acid activators (co-catalysts) include Group 13 metal compounds containing from 1 to 3 ($C_1$-$C_{20}$)hydrocarbyl substituents as described herein. In one embodiment, Group 13 metal compounds are tri(($C_1$-$C_{20}$)hydrocarbyl)-substituted-aluminum or tri(($C_1$-$C_{20}$)hydrocarbyl)-boron compounds. In other embodiments, Group 13 metal compounds are tri(hydrocarbyl)-substituted-aluminum, tri(($C_1$-$C_{20}$)hydrocarbyl)-boron compounds, tri(($C_1$-$C_{10}$)alkyl)aluminum, tri(($C_6$-$C_{15}$)aryl)boron compounds, and halogenated (including perhalogenated) derivatives thereof. In further embodiments, Group 13 metal compounds are tris(fluoro-substituted phenyl)boranes, tris(pentafluorophenyl)borane. In some embodiments, the activating co-catalyst is a tris(($C_1$-$C_{20}$)hydrocarbyl borate (e.g. trityl tetrafluoroborate) or a tri(($C_1$-$C_{20}$)hydrocarbyl)ammonium tetra(($C_1$-$C_{20}$)hydrocarbyl)borate (e.g. bis(octadecyl)methylammonium tetrakis(pentafluorophenyl)borate). As used herein, the term "ammonium" means a nitrogen cation that is a (($C_1$-$C_{20}$)hydrocarbyl)$_4$N$^+$ a (($C_1$-$C_{20}$)hydrocarbyl)$_3$N(H)$^+$, a (($C_1$-$C_{20}$)hydrocarbyl)$_2$N(H)$_2^+$, ($C_1$-$C_{20}$)hydrocarbylN(H)$_3^+$, or N(H)$_4^+$, wherein each ($C_1$-$C_{20}$)hydrocarbyl, when two or more are present, may be the same or different.

Combinations of neutral Lewis acid activators (co-catalysts) include mixtures comprising a combination of a tri(($C_1$-$C_4$)alkyl)aluminum and a halogenated tri(($C_6$-$C_{18}$)aryl)boron compound, especially a tris(pentafluorophenyl)borane. Other embodiments are combinations of such neutral Lewis acid mixtures with a polymeric or oligomeric alumoxane, and combinations of a single neutral Lewis acid, especially tris(pentafluorophenyl)borane with a polymeric or oligomeric alumoxane.

The catalyst system comprising the metal-ligand complex of formula (I) may be activated to form an active catalyst composition by combination with one or more co-catalysts, for example, a cation forming co-catalyst, a strong Lewis acid, or combinations thereof. Suitable activating co-catalysts include polymeric or oligomeric aluminoxanes, especially methyl aluminoxane, as well as inert, compatible, noncoordinating, ion forming compounds. Exemplary suitable co-catalysts include, but are not limited to: modified methyl aluminoxane (MMAO), bis(hydrogenated tallow alkyl)methyl, tetrakis(pentafluorophenyl)borate(1$^-$) amine, and combinations thereof.

In some embodiments, one or more of the foregoing activating co-catalysts are used in combination with each other. An especially preferred combination is a mixture of a tri(($C_1$-$C_4$)hydrocarbyl)aluminum, tri(($C_1$-$C_4$)hydrocarbyl)borane, or an ammonium borate with an oligomeric or polymeric alumoxane compound. The ratio of total number of moles of one or more metal-ligand complexes of formula (I) to total number of moles of one or more of the activating co-catalysts is from 1:10,000 to 100:1. In some embodiments, the ratio is at least 1:5000, in some other embodiments, at least 1:1000; and 10:1 or less, and in some other embodiments, 1:1 or less. When an alumoxane alone is used as the activating co-catalyst, preferably the number of moles of the aluminum that are employed is at least 10 times the number of moles of the metal-ligand complex of formula (I). For example, when tris(pentafluorophenyl)borane alone may be used as the activating co-catalyst, in some other embodiments, the number of moles of the tris(pentafluorophenyl)borane that are employed to the total number of moles of one or more metal-ligand complexes of formula (I) from 0.5:1 to 10:1, from 1:1 to 6:1, or from 1:1 to 5:1. The remaining activating co-catalysts are generally employed in approximately mole quantities equal to the total mole quantities of one or more metal-ligand complexes of formula (I).

Films

In some embodiments, the presently-disclosed embodiments relate to films formed from any of the presently-disclosed polyethylene compositions as described herein. In some embodiments, the film may be a blown film or a cast film. In embodiments, the film may be an extrusion coated film. In some embodiments, the film may be a monolayer film. The film, in some embodiments, may be a multilayer film. In some embodiments of multilayer films that include the presently-disclosed polyethylene compositions, a multilayer film may include a polyethylene composition of the present disclosure in a surface layer and/or in an inner layer. In embodiments, the presently-disclosed polyethylene compositions may be used to provide a sealant layer in a multilayer film. For example, the presently-disclosed polyethylene compositions may be in an outer layer of a multilayer film formed by coextrusion through a blown film or cast film process. A sealant layer may provide a heat-sealable surface. As used herein, a heat-sealable surface is a surface that may allow the surface of the film to be heat-sealed to another surface of the same film or to the surface of another film or substrate.

In one or more embodiments, the presently-disclosed polyethylene compositions may be blended with other polymers, such as other polyethylenes or even other non-polyethylene-based polymers. For example, the presently-disclosed polyethylene compositions may be blended with conventional polyethylene compositions such as, without limitation, LDPEs, LLDPEs, HDPEs, MDPEs, and/or polyethylene-based plastomers or elastomers known to those skilled in the art.

The amount of the polyethylene composition to use in films of the present embodiments can depend on a number of factors including, for example, whether the film is a monolayer or multilayer film, the other layers in the film if it is a multilayer film, the end use application of the film, and others.

Films of the present disclosure can have a variety of thicknesses. The thickness of the film can depend on a number of factors including, for example, whether the film is a monolayer or multilayer film, the other layers in the film if it is a multilayer film, the desired properties of the film, the end use application of the film, the equipment available to manufacture the film, and others. In some embodiments, a film of the present disclosure has a thickness of up to 10 mils. For example, the film can have a thickness from a lower limit of 0.25 mils, 0.5 mils, 0.7 mils, 1.0 mil, 1.75 mils, or 2.0 mils to an upper limit of 4.0 mils, 6.0 mils, 8.0 mils, or 10 mils. In embodiments, the film can have a thickness from 0.25 mils, to 2.0 mils, from 0.25 mils to 1.75 mils, from 0.25 mils to 1.0 mils, from 0.25 mils to 0.7 mils, from 0.25 mils to 0.5 mils, from 0.5 mils, to 2.0 mils, from 0.5 mils to 1.75 mils, from 0.5 mils to 1.0 mils, from 0.5 mils to 0.7 mils, from 0.7 mils, to 2.0 mils, from 0.7 mils to 1.75 mils, from 0.7 mils to 1.0 mils, from 1.0 mils, to 2.0 mils, from 1.0 mils to 1.75 mils, from 1.75 mils, to 2.0 mils, or any combinations.

In embodiments where the film comprises a multilayer film, the number of layers in the film can depend on a number of factors including, for example, the desired properties of the film, the desired thickness of the film, the content of the other layers of the film, the end use application of the film, the equipment available to manufacture the film, and others. A multilayer blown film can comprise up to 2, 3, 4, 5, 6, 7, 8, 9, 10, or 11 layers in various embodiments.

The polyethylene compositions, in some embodiments, can be used in more than one layer of the film. Other layers within a multilayer film of the present disclosure can comprise, in various embodiments, a polymer selected from the following: the presently-disclosed polyethylene compositions, a LLDPE, a VLDPE (a very low density polyethylene), a MDPE, a LDPE, a HDPE, a HMWHDPE (a high molecular weight HDPE), a propylene-based polymer, a polyolefin plastomer (POP), a polyolefin elastomer (POE), an olefin block copolymer (OBC), an ethylene vinyl acetate, an ethylene acrylic acid, an ethylene methacrylic acid, an ethylene methyl acrylate, an ethylene ethyl acrylate, an ethylene butyl acrylate, an isobutylene, a maleic anhydride-grafted polyolefin, an ionomer of any of the foregoing, or a combination thereof. In some embodiments, a multilayer film of the present disclosure can comprise one or more tie layers known to those of skill in the art.

In additional embodiments of the polyolefin films described herein, other layers may be adhered to, for example, a polyethylene film by a tie layer (sometimes in addition to a barrier layer). A tie layer may be used to adhere layers of dissimilar materials. For example, a barrier layer comprising ethylene vinyl alcohol (EVOH) may be adhered to a polyethylene material by a tie layer (i.e. a tie layer comprising maleic anhydride grafted polyethylene). For example, the polyolefin film can further comprise other layers typically included in multilayer structures depending on the application including, for example, other barrier layers, structural or strength layers, sealant layers, other tie layers, other polyethylene layers, polypropylene layers, etc. In additional embodiments, a printed layer may be included that may be an ink layer, which is applied to the film, to show product details and other packaging information in various colors.

It should be understood that any of the foregoing layers can further comprise one or more additives as known to those of skill in the art such as, for example, antioxidants, ultraviolet light stabilizers, thermal stabilizers, slip agents, antiblocks, pigments or colorants, processing aids, cross-linking catalysts, flame retardants, fillers and foaming agents. In some embodiments, the polyethylene compositions comprise up to 5 weight percent of such additional additives. All individual values and subranges from 0 to 5 wt. % are included and disclosed herein; for example, the total amount of additives in the polymer blend can be from a lower limit of 0, 0.5, 1, 1.5, 2, or 2.5 wt. % to an upper limit of 1.5, 2, 2.5, 3, 3.5, 4, 4.5, or 5 wt. %. In embodiments, the total amount of additives in the polymer blend can be from 0 wt. % to 5 wt. %, 0 wt. % to 4.5 wt. %, 0 wt. % to 4 wt. %, 0 wt. % to 3.5 wt. %, 0 wt. % to 3 wt. %, 0 wt. % to 2.5 wt. %, 0 wt. % to 2 wt. %, 0 wt. % to 1.5 wt. %, 0 wt. % to 1 wt. %, 0 wt. % to 0.5 wt. %, 0.5 wt. % to 5 wt. %, 0.5 wt. % to 4.5 wt. %, 0.5 wt. % to 4 wt. %, 0.5 wt. % to 3.5 wt. %, 0.5 wt. % to 3 wt. %, 0.5 wt. % to 2.5 wt. %, 0.5 wt. % to 2 wt. %, 0.5 wt. % to 1.5 wt. %, 0.5 wt. % to 1 wt. %, 1 wt. % to 5 wt. %, 1 wt. % to 4.5 wt. %, 1 wt. % to 4 wt. %, 1 wt. % to 3.5 wt. %, 1 wt. % to 3 wt. %, 1 wt. % to 2.5 wt. %, 1 wt. % to 2 wt. %, 1 wt. % to 1.5 wt. %, 1.5 wt. % to 5 wt. %, 1.5 wt. % to 4.5 wt. %, 1.5 wt. % to 4 wt. %, 1.5 wt. % to 3.5 wt. %, 1.5 wt. % to 3 wt. %, 1.5 wt. % to 2.5 wt. %, 1.5 wt. % to 2 wt. %, 2 wt. % to 5 wt. %, 2 wt. % to 4.5 wt. %, 2 wt. % to 4 wt. %, 2 wt. % to 3.5 wt. %, 2 wt. % to 3 wt. %, 2 wt. % to 2.5 wt. %, 2.5 wt. % to 5 wt. %, 2.5 wt. % to 4.5 wt. %, 2.5 wt. % to 4 wt. %, 2.5 wt. % to 3.5 wt. %, 2.5 wt. % to 3 wt. %, 3 wt. % to 5 wt. %, 3 wt. % to 4.5 wt. %, 3 wt. % to 4 wt. %, 3 wt. % to 3.5 wt. %, 3.5 wt. % to 5 wt. %, 3.5 wt. % to 4.5 wt. %, 3.5 wt. % to 4 wt. %, 4 wt. % to 5 wt. %, 4 wt. % to 4.5 wt. %, or 4.5 wt. % to 5 wt. %, or any combinations of these ranges.

By being polyethylene compositions, the presently-disclosed polyethylene compositions, according to some embodiments, can be incorporated into multilayer films and articles that are comprised primarily, if not substantially or entirely, of polyolefins, or more preferably, of polyethylene, in order to provide a film and article that is more easily recyclable. The polyethylene compositions of the present disclosure are particularly advantageous in proving films wherein the film is formed primarily from polyethylene. For example, a monolayer or multilayer film wherein the film comprises primarily polyethylene may have an improved recyclability profile in addition to other advantages that the usage of such polymers may provide. In some embodiments, the film comprises 90 wt. % or more polyethylene based on the total weight of the film. In other embodiments, the film comprises 91 wt. % or more, 92 wt. % or more, 93 wt. % or more, 94 wt. % or more, 95 wt. % or more, 96 wt. % or more, 97 wt. % or more, 98 wt. % or more, or 99 wt. % or more polyethylene based on the total weight of the film.

In some embodiments, the film comprising a layer formed from the presently-disclosed polyethylene compositions can be laminated to another film substrate. Substrates may include films comprising polyester, nylon, polypropylene, polyethylene, and combinations. For preferred recyclability substrates, a biaxially oriented polyethylene (BOPE) substrate, a machine direction oriented polyethylene (MDO) substrate, or a coextruded polyethylene film may be included in the laminate structure.

Films of the present disclosure, in some embodiments, can be corona treated and/or printed (e.g., reverse or surface printed) using techniques known to those of skill in the art.

In some embodiments, films of the present disclosure can be oriented, uniaxially (e.g., in the machine direction) or biaxially, using techniques known to those of skill in the art.

In embodiments, films including the polyethylene compositions of the present disclosure may have a blocking force of less than 40 mN/inch or less than 35 mN/inch when measured according to the methods described hereinbelow. Similar methods may be utilized to observe the blocking force of monolayer and other multilayer films. In embodiments of monolayer and other multilayer films may have a blocking force comparable to or less than comparative films that do not utilize the polyethylene compositions described herein.

Articles

Embodiments of the present disclosure also relate to articles, such as packages, formed from or incorporating polyethylene compositions of the present disclosure (i.e., through films incorporating polyethylene compositions of the present disclosure). Such packages can be formed from any of the polyethylene compositions of the present disclosure (i.e., through films incorporating polyethylene-based compositions of the present disclosure) described herein. Such packages formed from any of the polyethylene compositions of the present disclosure may be sealable by various sealing methods known in the art, such as heat seal methods.

Examples of such articles can include flexible packages, pouches, stand-up pouches, and pre-made packages or pouches. In some embodiments, multilayer films or laminates of the present disclosure can be used for food packages. Examples of food that can be included in such packages include meats, cheeses, cereal, nuts, snacks, juices, sauces, and others. Such packages can be formed using techniques known to those of skill in the art based on the teachings herein and based on the particular use for the package (e.g., type of food, amount of food, etc.).

Low heat seal initiation temperatures such as those provided by the polyethylene compositions of the present invention may be particularly desirable for automated packaging systems where the item being packaged is loaded into the package as it is being made. Lower heat seal initiation temperatures may be advantageous to increase packaging productivity by minimizing the time and energy needed to heat and cool a sealant. In the case of recyclable polyethylene packaging having an inner sealant layer that seals at a temperature significantly lower than that of the outside polyethylene layer may enable a broader range of temperatures to make heat sealed packages, which may often be referred to as the packaging heat seal window. Some examples of such automated packaging equipment are called vertical form fill and seal (VFFS) machines or horizontal form fill and seal (HFFS) machines.

Test Methods

Unless otherwise indicated herein, the following analytical methods are used in describing aspects of the present disclosure:

Melt Index

Melt indices $I_2$ (or I2) and $I_{10}$ (or I10) of polymer samples were measured in accordance to ASTM D-1238 (method B) at 190° C. and at 2.16 kg and 10 kg load, respectively. Their values are reported in g/10 min.

Density

Samples for density measurement were prepared according to ASTM D4703. Measurements were made, according to ASTM D792, Method B, within one hour of sample pressing.

Creep Zero Shear Viscosity Measurement Method

Zero-shear viscosities are obtained via creep tests that were conducted on an AR-G2 stress controlled rheometer (TA Instruments; New Castle, Del) using 25-mm-diameter parallel plates at 190° C. The rheometer oven is set to test temperature for at least 30 minutes prior to zeroing fixtures. At the testing temperature a compression molded sample disk is inserted between the plates and allowed to come to equilibrium for 5 minutes. The upper plate is then lowered down to 50 m above the desired testing gap (1.5 mm). Any superfluous material is trimmed off and the upper plate is lowered to the desired gap. Measurements are done under nitrogen purging at a flow rate of 5 L/min. Default creep time is set for 2 hours.

A constant low shear stress of 20 Pa is applied for all of the samples to ensure that the steady state shear rate is low enough to be in the Newtonian region. The resulting steady state shear rates are in the range of $10^{-3}$ to $10^{-4}$ s$^{-1}$ for the samples in this study. Steady state is determined by taking a linear regression for all the data in the last 10% time window of the plot of log (J(t)) vs. log(t), where J(t) is creep compliance and t is creep time. If the slope of the linear regression is greater than 0.97, steady state is considered to be reached, then the creep test is stopped. In all cases in this study the slope meets the criterion within 2 hours. The steady state shear rate is determined from the slope of the linear regression of all of the data points in the last 10% time window of the plot of F vs. t, where F is strain. The zero-shear viscosity is determined from the ratio of the applied stress to the steady state shear rate.

In order to determine if the sample is degraded during the creep test, a small amplitude oscillatory shear test is conducted before and after the creep test on the same specimen from 0.1 to 100 rad/s. The complex viscosity values of the two tests are compared. If the difference of the viscosity values at 0.1 rad/s is greater than 5%, the sample is considered to have degraded during the creep test, and the result is discarded.

Gel Permeation Chromatography (GPC)

The chromatographic system consisted of a PolymerChar GPC-IR (Valencia, Spain) high temperature GPC chromatograph equipped with an internal IR5 infra-red detector (IR5). The autosampler oven compartment was set at 1600 Celsius and the column compartment was set at 1500 Celsius. The columns used were 4 Agilent "Mixed A" 30 cm 20-micron linear mixed-bed columns and a 20-um pre-column. The chromatographic solvent used was 1,2,4 trichlorobenzene and contained 200 ppm of butylated hydroxytoluene (BHT). The solvent source was nitrogen sparged. The injection volume used was 200 microliters and the flow rate was 1.0 milliliters/minute.

Calibration of the GPC column set was performed with 21 narrow molecular weight distribution polystyrene standards with molecular weights ranging from 580 to 8,400,000 and were arranged in 6 "cocktail" mixtures with at least a decade of separation between individual molecular weights. The standards were purchased from Agilent Technologies. The polystyrene standards were prepared at 0.025 grams in 50 milliliters of solvent for molecular weights equal to or greater than 1,000,000, and 0.05 grams in 50 milliliters of solvent for molecular weights less than 1,000,000. The polystyrene standards were dissolved at 80 degrees Celsius with gentle agitation for 30 minutes. The polystyrene standard peak molecular weights were converted to polyethylene molecular weights using Equation 1 (as described in Williams and Ward, J. Polym. Sci., Polym. Let., 6, 621 (1968)):

$$M_{polyethylene} = A \times (M_{polystyrene}) \qquad \text{(EQ. 1)}$$

where M is the molecular weight, A has a value of 0.4315 and B is equal to 1.0.

A fifth order polynomial was used to fit the respective polyethylene-equivalent calibration points. A small adjustment to A (from approximately 0.375 to 0.445) was made to correct for column resolution and band-broadening effects such that linear homopolymer polyethylene standard is obtained at 120,000 Mw.

The total plate count of the GPC column set was performed with decane (prepared at 0.04 g in 50 milliliters of TCB and dissolved for 20 minutes with gentle agitation.) The plate count (Equation 2) and symmetry (Equation 3) were measured on a 200 microliter injection according to the following equations:

$$\text{Plate Count} = 5.54 * \left( \frac{(RV_{Peak\,Max})}{\text{Peak Width at } \frac{1}{2} \text{ height}} \right)^2 \qquad \text{(EQ. 2)}$$

where RV is the retention volume in milliliters, the peak width is in milliliters, the peak max is the maximum height of the peak, and ½ height is ½ height of the peak maximum.

$$\text{Symmetry} = \frac{(\text{Rear Peak } RV_{one\,tenth\,height} - RV_{Peak\,max})}{(RV_{Peak\,max} - \text{Front Peak } RV_{one\,tenth\,height})} \qquad \text{(EQ. 3)}$$

where RV is the retention volume in milliliters and the peak width is in milliliters, Peak max is the maximum position of the peak, one tenth height is ¹⁄₁₀ height of the peak maximum, and where rear peak refers to the peak tail at later retention volumes than the peak max and where front peak refers to the peak front at earlier retention volumes than the peak max. The plate count for the chromatographic system should be greater than 18,000 and symmetry should be between 0.98 and 1.22.

Samples were prepared in a semi-automatic manner with the PolymerChar "Instrument Control" Software, wherein the samples were weight-targeted at 2 mg/ml, and the solvent (contained 200 ppm BHT) was added to a pre nitrogen-sparged septa-capped vial, via the PolymerChar high temperature autosampler. The samples were dissolved for 2 hours at 1600 Celsius under "low speed" shaking.

The calculations of $Mn_{(GPC)}$, $Mw_{(GPC)}$, and $Mz_{(GPC)}$ were based on GPC results using the internal IR5 detector (measurement channel) of the PolymerChar GPC-IR chromatograph according to Equations 4-6, using PolymerChar GPCOne™ software, the baseline-subtracted IR chromatogram at each equally-spaced data collection point (i), and the polyethylene equivalent molecular weight obtained from the narrow standard calibration curve for the point (i) from Equation 1.

$$Mn_{(GPC)} = \frac{\sum_i IR_i}{\sum_i (IR_i/M_{polyethylene_i})} \quad \text{(EQ. 4)}$$

$$Mw_{(GPC)} = \frac{\sum_i (IR_i * M_{polyethylene_i})}{\sum_i IR_i} \quad \text{(EQ. 5)}$$

$$Mz_{(GPC)} = \frac{\sum_i (IR_i * M_{polyethylene_i}^2)}{\sum_i (IR_i * M_{polyethylene_i})} \quad \text{(EQ. 6)}$$

In order to monitor the deviations over time, a flowrate marker (decane) was introduced into each sample via a micropump controlled with the PolymerChar GPC-IR system. This flowrate marker (FM) was used to linearly correct the pump flowrate (Flowrate(nominal)) for each sample by RV alignment of the respective decane peak within the sample (RV(FM Sample)) to that of the decane peak within the narrow standards calibration (RV(FM Calibrated)). Any changes in the time of the decane marker peak are then assumed to be related to a linear-shift in flowrate (Flowrate (effective)) for the entire run. To facilitate the highest accuracy of a RV measurement of the flow marker peak, a least-squares fitting routine is used to fit the peak of the flow marker concentration chromatogram to a quadratic equation. The first derivative of the quadratic equation is then used to solve for the true peak position. After calibrating the system based on a flow marker peak, the effective flowrate (with respect to the narrow standards calibration) is calculated as Equation 7. Processing of the flow marker peak was done via the PolymerChar GPCOne™ Software. Acceptable flowrate correction is such that the effective flowrate should be within +/−0.5% of the nominal flowrate.

$$\text{Flowrate}_{(effective)} = \text{Flowrate}_{(nominal)} * (RV_{(FM\ Calibrated)}/RV_{(FM\ Sample)}) \quad \text{(EQ. 7)}$$

Molecular Weighted Comonomer Distribution Index (MWCDI)

A GPC-IR, high temperature chromatographic system from PolymerChar (Valencia, Spain) was equipped with a Precision Detectors' (Amherst, MA) 2-angle laser light scattering detector Model 2040, and an IR5 infra-red detector (GPC-IR) and a 4-capillary viscometer, both from PolymerChar. The "15-degree angle" of the light scattering detector was used for calculation purposes. Data collection was performed using PolymerChar Instrument Control software and data collection interface. The system was equipped with an on-line, solvent degas device and pumping system from Agilent Technologies (Santa Clara, CA).

Injection temperature was controlled at 150 degrees Celsius. The columns used, were four, 20-micron "Mixed-A" light scattering columns from Polymer Laboratories (Shropshire, UK). The solvent was 1,2,4-trichlorobenzene. The samples were prepared at a concentration of "0.1 grams of polymer in 50 milliliters of solvent." The chromatographic solvent and the sample preparation solvent each contained "200 ppm of butylated hydroxytoluene (BHT)." Both solvent sources were nitrogen sparged. Ethylene-based polymer samples were stirred gently, at 160 degrees Celsius, for three hours. The injection volume was "200 microliters," and the flow rate was "1 milliliters/minute."

Calibration of the GPC column set was performed with 21 "narrow molecular weight distribution" polystyrene standards, with molecular weights ranging from 580 to 8,400,000 g/mole. These standards were arranged in six "cocktail" mixtures, with at least a decade of separation between individual molecular weights. The standards were purchased from Polymer Laboratories (Shropshire UK). The polystyrene standards were prepared at "0.025 grams in 50 milliliters of solvent" for molecular weights equal to, or greater than, 1,000,000 g/mole, and at "0.050 grams in 50 milliliters of solvent" for molecular weights less than 1,000,000 g/mole. The polystyrene standards were dissolved at 80 degrees Celsius, with gentle agitation, for 30 minutes. The narrow standards mixtures were run first, and in order of decreasing "highest molecular weight component," to minimize degradation. The polystyrene standard peak molecular weights were converted to polyethylene molecular weights using Equation 1 (as described in Williams and Ward, J. Polym. Sci., Polym. Let., 6, 621 (1968)):

where M is the molecular weight, A has a value of approximately 0.40 and B is equal to 1.0. The A value was adjusted between 0.375 and 0.445 (depending upon specific column-set efficiency), such that NBS 1475A (NIST) linear polyethylene weight-average molecular weight corresponded to 52,000 g/mole, as calculated by Equation, below:

$$Mn(LALS\ gpc) = \frac{\sum_{i=RV_{integration\ start}}^{i=RV_{integration\ end}} (IR_{measurement\ channel_i})}{\sum_{i=RV_{integration\ start}}^{i=RV_{integration\ end}} (IR_{measurement\ channel_i}/M_{PE_i})} \quad \text{(Eqn. 8)}$$

$$Mw(LALS\ gpc) = \frac{\sum_{i=RV_{integration\ start}}^{i=RV_{integration\ end}} (M_{PE_i} IR_{measurement\ channel_i})}{\sum_{i=RV_{integration\ start}}^{i=RV_{integration\ end}} (IR_{measurement\ channel_i})} \quad \text{(Eqn. 9)}$$

In Equations 8 and 9, RV is column retention volume (linearly-spaced), collected at "1 point per second." The JR is the baseline-subtracted JR detector signal, in Volts, from the measurement channel of the GPC instrument, and the MPE is the polyethylene-equivalent MW determined from Equation 1 above. Data calculation were performed using "GPC One software (version 2.013H)" from PolymerChar.

A calibration for the IR5 detector ratios was performed using at least ten ethylene-based polymer standards (polyethylene homopolymer and ethylene/octene copolymers; narrow molecular weight distribution and homogeneous comonomer distribution) of known short chain branching (SCB) frequency (measured by the 13C NMR Method, as discussed above), ranging from homopolymer (0 SCB/1000 total C) to approximately 50 SCB/1000 total C, where total C carbons in backbone+carbons in branches. Each standard had a weight-average molecular weight from 36,000 g/mole to 126,000 g/mole, as determined by the GPC-LALS processing method described above. Each standard had a molecular weight distribution (Mw/Mn) from 2.0 to 2.5, as determined by the GPC-LALS processing method described above. Polymer properties for the SCB standards are shown in Table A.

TABLE A

"SCB" Standards

| Wt % Comonomer | IR5 Area ratio | SCB/1000 Total C | Mw | Mw/Mn |
|---|---|---|---|---|
| 23.1 | 0.2411 | 28.9 | 37,300 | 2.22 |
| 14.0 | 0.2152 | 17.5 | 36,000 | 2.19 |
| 0.0 | 0.1809 | 0.0 | 38,400 | 2.20 |
| 35.9 | 0.2708 | 44.9 | 42,200 | 2.18 |
| 5.4 | 0.1959 | 6.8 | 37,400 | 2.16 |
| 8.6 | 0.2043 | 10.8 | 36,800 | 2.20 |
| 39.2 | 0.2770 | 49.0 | 125,600 | 2.22 |
| 1.1 | 0.1810 | 1.4 | 107,000 | 2.09 |
| 14.3 | 0.2161 | 17.9 | 103,600 | 2.20 |
| 9.4 | 0.2031 | 11.8 | 103,200 | 2.26 |

The "IR5 Area Ratio (or "IR5 Methyl Channel Area/IR5 Measurement Channel Area")" of "the baseline-subtracted area response of the IR5 methyl channel sensor" to "the baseline-subtracted area response of IR5 measurement channel sensor" (standard filters and filter wheel as supplied by PolymerChar: Part Number IR5_FWM01 included as part of the GPC-IR instrument) was calculated for each of the "SCB" standards. A linear fit of the SCB frequency versus the "IR5 Area Ratio" was constructed in the form of the following Equation 10:

$$SCB/1000 \text{ total } C = A0 + [A1 \times (IR5 \text{ Methyl Channel Area}/IR5 \text{ Measurement Channel Area})] \quad \text{(Eqn. 10)},$$

where A0 is the "SCB/1000 total C" intercept at an "IR5 Area Ratio" of zero, and A1 is the slope of the "SCB/1000 total C" versus "IR5 Area Ratio," and represents the increase in the "SCB/1000 total C" as a function of "IR5 Area Ratio."

A series of "linear baseline-subtracted chromatographic heights" for the chromatogram generated by the "IR5 methyl channel sensor" was established as a function of column elution volume, to generate a baseline-corrected chromatogram (methyl channel). A series of "linear baseline-subtracted chromatographic heights" for the chromatogram generated by the "IR5 measurement channel" was established as a function of column elution volume, to generate a base-line-corrected chromatogram (measurement channel).

The "IR5 Height Ratio" of "the baseline-corrected chromatogram (methyl channel)" to "the baseline-corrected chromatogram (measurement channel)" was calculated at each column elution volume index (each equally-spaced index, representing 1 data point per second at 1 ml/min elution) across the sample integration bounds. The "IR5 Height Ratio" was multiplied by the coefficient A1, and the coefficient A0 was added to this result, to produce the predicted SCB frequency of the sample. The result was converted into mole percent comonomer, as follows in Equation 11:

$$\text{Mole Percent Comonomer} = \{SCBf/[SCBf + ((1000 - SCBf*\text{Length of comonomer})/2)]\}*100 \quad \text{(Eqn. 11)},$$

where "SCBf" is the "SCB per 1000 total C" and the "Length of comonomer"=8 for octene, 6 for hexene, and so forth.

Each elution volume index was converted to a molecular weight value (Mwi) using the method of Williams and Ward (described above; Eqn. 1). The "Mole Percent Comonomer (y axis)" was plotted as a function of Log(Mwi), and the slope was calculated between long Mwi value with Mwi of 15,000 and long Mwi value with Mwi of 150,000 g/mole (end group corrections on chain ends were omitted for this calculation). An EXCEL linear regression was used to calculate the slope between, and including, Mwi from 15,000 to 150,000 g/mole. This slope is defined as the molecular weighted comonomer distribution index (MWCDI=Molecular Weighted Comonomer Distribution Index).

Improved Method for Comonomer Content Distribution Analysis (iCCD)

Improved method for comonomer content analysis (iCCD) was developed in 2015 (Cong and Parrott et al., WO2017040127A1). iCCD test was performed with Crystallization Elution Fractionation instrumentation (CEF) (PolymerChar, Spain) equipped with IR-5 detector (PolymerChar, Spain) and two angle light scattering detector Model 2040 (Precision Detectors, currently Agilent Technologies). A guard column packed with 20-27 micron glass (MoSCi Corporation, USA) in a 5 cm or 10 cm (length)×¼" (ID) stainless was installed just before IR-5 detector in the detector oven. Ortho-dichlorobenzene (ODCB, 99% anhydrous grade or technical grade) was used. Silica gel 40 (particle size 0.2~0.5 mm, catalogue number 10181-3) from EMD Chemicals was obtained (can be used to dry ODCB solvent before). The CEF instrument is equipped with an autosampler with N2 purging capability. ODCB is sparged with dried nitrogen (N2) for one hour before use. Sample preparation was done with autosampler at 4 mg/ml (unless otherwise specified) under shaking at 160° C. for 1 hour. The injection volume was 300 µl. The temperature profile of iCCD was: crystallization at 3° C./min from 105° C. to 30° C., the thermal equilibrium at 30° C. for 2 minute (including Soluble Fraction Elution Time being set as 2 minutes), elution at 3° C./min from 30° C. to 140° C. The flow rate during crystallization is 0.0 ml/min. The flow rate during elution is 0.50 ml/min. The data was collected at one data point/second.

The iCCD column was packed with gold coated nickel particles (Bright 7GNM8-NiS, Nippon Chemical Industrial Co.) in a 15 cm (length)×¼" (ID) stainless tubing. The column packing and conditioning were with a slurry method according to the reference (Cong, R.; Parrott, A.; Hollis, C.; Cheatham, M. WO2017040127A1). The final pressure with TCB slurry packing was 150 Bars.

Column temperature calibration was performed by using a mixture of the Reference Material Linear homopolymer polyethylene (having zero comonomer content, Melt index ($I_2$) of 1.0, polydispersity $M_w/M_n$ approximately 2.6 by conventional gel permeation chromatography, 1.0 mg/ml) and Eicosane (2 mg/ml) in ODCB. iCCD temperature calibration consisted of four steps: (1) Calculating the delay volume defined as the temperature offset between the measured peak elution temperature of Eicosane minus 30.00° C.; (2) Subtracting the temperature offset of the elution temperature from iCCD raw temperature data. It is noted that this temperature offset is a function of experimental conditions, such as elution temperature, elution flow rate, etc.; (3) Creating a linear calibration line transforming the elution temperature across a range of 30.00° C. and 140.00° C. so that the linear homopolymer polyethylene reference had a peak temperature at 101.0° C., and Eicosane had a peak temperature of 30.0° C.; (4) For the soluble fraction measured isothermally at 30° C., the elution temperature below 30.0° C. is extrapolated linearly by using the elution heating rate of 3° C./min according to the reference (Cerk and Cong et al., U.S. Pat. No. 9,688,795).

The comonomer content versus elution temperature of iCCD was constructed by using 12 reference materials (ethylene homopolymer and ethylene-octene random copolymer made with single site metallocene catalyst, having ethylene equivalent weight average molecular weight ranging from 35,000 to 128,000). All of these reference materials were analyzed same way as specified previously at 4 mg/mL. The reported elution peak temperatures were linearly fit to the linear equation y=−6.3515x.+101.00, where y represented elution temperature of iCCD and x represented the octene mole %, and $R^2$ was 0.978.

Molecular weight of polymer and the molecular weight of the polymer fractions was determined directly from LS detector (90 degree angle) and concentration detector (IR-5) according Rayleigh-Gans-Debys approximation (Striegel and Yau, Modern Size Exclusion Liquid Chromatogram, Page 242 and Page 263) by assuming the form factor of 1 and all the virial coefficients equal to zero. Integration windows are set to integrate all the chromatograms in the elution temperature (temperature calibration is specified above) range from 23.0 to 120° C.

The calculation of Molecular Weight (Mw) from iCCD includes the following four steps:
(1) Measuring the interdetector offset. The offset is defined as the geometric volume offset between LS with respect to concentration detector. It is calculated as the difference in the elution volume (mL) of polymer peak between concentration detector and LS chromatograms. It is converted to the temperature offset by using elution thermal rate and elution flow rate. A linear high density polyethylene (having zero comonomer content, Melt index ($I_2$) of 1.0, polydispersity $M_w/M_n$ approximately 2.6 by conventional gel permeation chromatography) is used. Same experimental conditions as the normal iCCD method above are used except the following parameters: crystallization at 10° C./min from 140° C. to 137° C., the thermal equilibrium at 137° C. for 1 minute as Soluble Fraction Elution Time, soluble fraction (SF) time of 7 minutes, elution at 3° C./min from 137° C. to 142° C. The flow rate during crystallization is 0.0 ml/min. The flow rate during elution is 0.80 ml/min. Sample concentration is 1.0 mg/ml.
(2) Each LS datapoint in LS chromatogram is shifted to correct for the interdetector offset before integration.
(3) Baseline subtracted LS and concentration chromatograms are integrated for the whole eluting temperature range of the Step (1). The MW detector constant is calculated by using a known MW HDPE sample in the range of 100,000 to 140,000 Mw and the area ratio of the LS and concentration integrated signals.
(4) Mw of the polymer was calculated by using the ratio of integrated light scattering detector (90 degree angle) to the concentration detector and using the MW detector constant.

Calculation of half width is defined as the temperature difference between the front temperature and the rear temperature at the half of the maximum peak height, the front temperature at the half of the maximum peak is searched forward from 35.0° C., while the rear temperature at the half of the maximum peak is searched backward from 119.0° C.

Zero-Shear Viscosity Ratio (ZSVR)

ZSVR is defined as the ratio of the zero-shear viscosity (ZSV) of the branched polyethylene material to the ZSV of the linear polyethylene material at the equivalent weight average molecular weight (Mw-gpc) according to the following Equations 8 and 9:

$$ZSVR = \frac{\eta_{0B}}{\eta_{0L}} \quad \text{(EQ. 8)}$$

$$\eta_{0L} = 2.29 \times 10^{-15} M_{w-gpc}^{3.65} \quad \text{(EQ. 9)}$$

The ZSV value is obtained from creep test at 190° C. via the method described above. The Mw-gpc value is determined by the conventional GPC method (Equation 5 in the Conventional GPC method description). The correlation between ZSV of linear polyethylene and its Mw-gpc was established based on a series of linear polyethylene reference materials. A description for the ZSV-Mw relationship can be found in the ANTEC proceeding: Karjala, Teresa P., Sammler, Robert L., Mangnus, Marc A., Hazlitt, Lonnie G., Johnson, Mark S., Hagen, Charles M. Jr., Huang, Joe W. L., Reichek, Kenneth N., "Detection of low levels of long-chain branching in polyolefins", Annual Technical Conference— Society of Plastics Engineers (2008), 66th 887-891.

EXAMPLES

Example 1: Preparation of Inventive Polyethylene Compositions 1-3 and Comparative Composition C Preparation of Inventive Polyethylene Composition 1 and Comparative Composition C Inventive Polyethylene Composition 1 (abbreviated to "Inventive PE Comp. 1"), which are described according to one or more embodiments of the detailed description, were prepared by a method and utilizing the catalysts and reactors described below. In addition, Comparative Composition C (abbreviated to "Comparative Comp. C") is prepared by a method and utilizing the catalyst and reactors described below.

All raw materials (monomer and comonomer) and the process solvent (a narrow boiling range high-purity isoparaffinic solvent, Isopar-E) were purified with molecular sieves before introduction into the reaction environment. Hydrogen was supplied pressurized as a high purity grade and was not further purified. The reactor monomer feed stream was pressurized via a mechanical compressor to above reaction pressure. The solvent and comonomer feed was pressurized via a pump to above reaction pressure. The individual catalyst components were manually batch diluted with purified solvent and pressured to above reaction pressure. All reaction feed flows were measured with mass flow meters and independently controlled with computer automated valve control systems.

Figure 2:
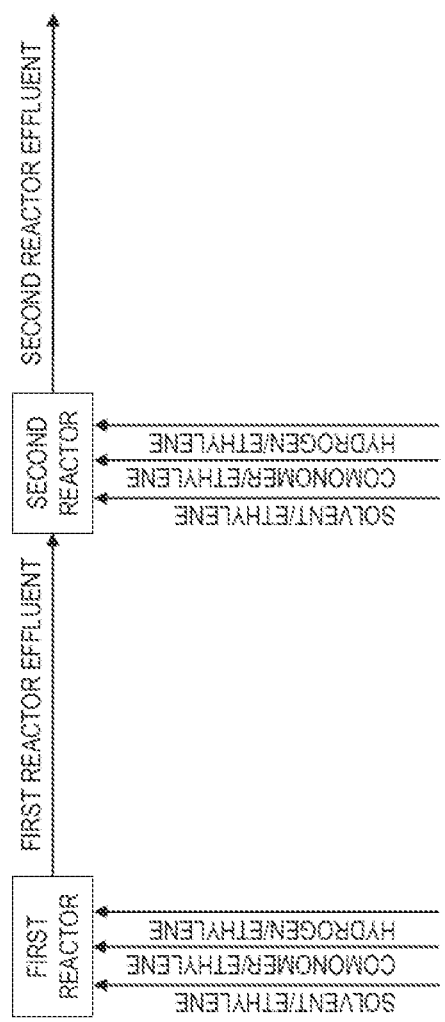
FIG. 2 schematically depicts a reactor system useful for producing polyethylene, according to one or more embodiments presently described.

A two reactor system was used in a series configuration, as is depicted in FIG. 2. Each continuous solution polymerization reactor utilized a liquid full, non-adiabatic, isothermal, circulating, loop reactor, which mimicked a continuously stirred tank reactor (CSTR) with heat removal. Independent control of all fresh solvent, monomer, comonomer, hydrogen, and catalyst component feeds were possible. The total fresh feed stream to each reactor (solvent, monomer, comonomer, and hydrogen) was temperature controlled to maintain a single solution phase by passing the feed stream through a heat exchanger. The total fresh feed to each polymerization reactor was injected into the reactor at two locations with approximately equal reactor volumes between each injection location. The fresh feed was controlled so that each injector received half of the total fresh feed mass flow. The catalyst components were injected into the polymerization reactor through injection stingers. The catalyst feed was computer controlled to maintain each reactor monomer conversion at the specified targets. The cocatalyst components were fed based on calculated specified molar ratios to the primary catalyst component. Immediately following each reactor feed injection location, the feed streams were mixed with the circulating polymerization reactor contents with static mixing elements. The contents of each reactor were continuously circulated through heat exchangers responsible for removing much of the heat of reaction and with the temperature of the coolant side responsible for maintaining an isothermal reaction environment at the specified temperature. Circulation around each reactor loop was provided by a pump.

The effluent from the first polymerization reactor (containing solvent, monomer, comonomer, hydrogen, catalyst components, and polymer) exited the first reactor loop and was added to the second reactor loop.

The second reactor effluent entered a zone where it was deactivated with the addition of and reaction with a suitable reagent (water). At this same reactor exit location, other additives were added for polymer stabilization (typical antioxidants suitable for stabilization during extrusion and film fabrication like Octadecyl 3,5-Di-Tert-Butyl-4-Hydroxyhydrocinnamate, Tetrakis(Methylene(3,5-Di-Tert-Butyl-4-Hydroxyhydrocinnamate))Methane, and Tris(2,4-Di-Tert-Butyl-Phenyl) Phosphite).

Following catalyst deactivation and additive addition, the second reactor effluent entered a devolatization system where the polymer was removed from the non-polymer stream. The isolated polymer melt was pelletized and collected. The non-polymer stream passed through various pieces of equipment, which separated most of the ethylene that was removed from the system. Most of the solvent and unreacted comonomer was recycled back to the reactor after passing through a purification system. A small amount of solvent and comonomer was purged from the process.

The reactor stream feed data flows that correspond to the values in Table 1. The data are presented such that the complexity of the solvent recycle system was accounted for and the reaction system can be treated more simply as a once through flow diagram. Table 2 shows the catalysts referenced in Table 1.

Preparation of Inventive Polyethylene Compositions 2-3

Inventive Polyethylene Compositions 2-3 (abbreviated to "Inventive PE Comp. #"), which are described according to one or more embodiments of the detailed description, were prepared by a method and utilizing the catalysts and reactors described below.

All raw materials (monomer and comonomer) and the process solvent (a narrow boiling range high-purity isoparaffinic solvent, Isopar-E) are purified with molecular sieves before introduction into the reaction environment. Hydrogen is supplied pressurized as a high purity grade and is not further purified. The reactor monomer feed stream is pressurized via a mechanical compressor to above reaction pressure. The solvent and comonomer feed is pressurized via a pump to above reaction pressure. The individual catalyst components are manually batch diluted with purified solvent and pressured to above reaction pressure. All reaction feed flows are measured with mass flow meters and independently controlled with computer automated valve control systems.

A two reactor system was used in a series configuration, as is depicted in FIG. 2. The first reactor is a continuous solution polymerization reactor consisting of a liquid full, non-adiabatic, isothermal, circulating, loop reactor which mimics a continuously stirred tank reactor (CSTR) with heat removal. Independent control of all fresh solvent, monomer, comonomer, hydrogen, and catalyst component feeds is possible. The total fresh feed stream to the first reactor (solvent, monomer, comonomer, and hydrogen) is temperature controlled to maintain a single solution phase by passing the feed stream through a heat exchanger. The total fresh feed to the first polymerization reactor is injected into the reactor at two locations with approximately equal reactor volumes between each injection location. The fresh feed is controlled with each injector receiving half of the total fresh feed mass flow. The catalyst components are injected into the polymerization reactor separate from the fresh feeds. The primary catalyst component feed is computer controlled to maintain the reactor monomer conversion at the specified value. The cocatalyst components are fed based on molar ratios to the primary catalyst component. Immediately following each first reactor feed injection location, the feed streams are mixed with the circulating polymerization reactor contents with static mixing elements. The contents of the first reactor are continuously circulated through heat exchangers responsible for removing much of the heat of reaction and with the temperature of the coolant side responsible for maintaining an isothermal reaction environment at the specified temperature. Circulation around the first reactor loop is provided by a pump.

The second reactor is a continuous solution polymerization reactor consisting of a liquid full, adiabatic, continuously stirred tank reactor (CSTR). Independent control of all fresh solvent, monomer, comonomer, hydrogen, and catalyst component feeds is possible. The total fresh feed stream to the second reactor (solvent, monomer, comonomer, and hydrogen) is temperature controlled to maintain a single solution phase by passing the feed stream through a heat exchanger. The total fresh feed to the second polymerization reactor is injected into the reactor at one location. The catalyst components are injected into the second polymerization reactor separate from the fresh feed. The primary catalyst component feed is computer controlled to maintain the reactor monomer conversion at the specified value. The cocatalyst component(s) is/are fed based on molar ratios to the primary catalyst component. Mixing of the second reactor is provided by an agitator. The effluent from the first polymerization reactor (containing solvent, monomer, comonomer, hydrogen, catalyst components, and polymer) exits the first reactor loop and is added to the second reactor separate from the fresh feed and separate from the catalyst feed components.

The second reactor effluent enters a zone where it is deactivated with the addition of and reaction with a suitable reagent (water). At this same reactor exit location, other additives were added for polymer stabilization (typical antioxidants suitable for stabilization during extrusion and film fabrication like Octadecyl 3,5-Di-Tert-Butyl-4-Hydroxyhydrocinnamate, Tetrakis(Methylene(3,5-Di-Tert-Butyl-4-Hydroxyhydrocinnamate))Methane, and Tris(2,4-Di-Tert-Butyl-Phenyl) Phosphite).

Following catalyst deactivation and additive addition, the second reactor effluent enters a devolatization system where the polymer is removed from the non-polymer stream. The isolated polymer melt is pelletized and collected. The non-polymer stream passes through various pieces of equipment which separate most of the ethylene which is removed from the system. Most of the solvent and unreacted comonomer is recycled back to the reactor after passing through a purification system. A small amount of solvent and comonomer is purged from the process.

The reactor stream feed data flows that correspond to the values in Table 1. The data are presented such that the complexity of the solvent recycle system was accounted for and the reaction system can be treated more simply as a once through flow diagram. Table 2 shows the catalysts referenced in Table 1.

TABLE 1

| Inventive Polyethylene Composition | | Inventive PE Comp. 1 | Inventive PE Comp. 2 | Inventive PE Comp. 3 | Comparative Composition C |
|---|---|---|---|---|---|
| Reactor Configuration | Type | Dual Series | Dual Series | Dual Series | Dual Series |
| Comonomer type | Type | 1-octene | 1-octene | 1-octene | 1-octene |
| First Reactor Feed Solvent/Ethylene Mass Flow Ratio | g/g | 4.22 | 5.61 | 5.15 | 4.63 |
| First Reactor Feed Comonomer/Ethylene Mass Flow Ratio | g/g | 0.41 | 0.40 | 0.60 | 0.42 |
| First Reactor Feed Hydrogen/Ethylene Mass Flow Ratio | g/g | 1.26E−04 | 7.88E−05 | 1.00E−04 | 9.57E−05 |
| First Reactor Temperature | °C. | 165 | 155 | 160 | 160 |
| First Reactor Pressure | barg | 50 | 43 | 43 | 50 |
| First Reactor Ethylene Conversion | % | 91.0 | 94.6 | 87.7 | 93.4 |
| First Reactor Catalyst Type | Type | Catalyst Component A | Catalyst Component A | Catalyst Component A | Catalyst Component A |
| First Reactor Catalyst Metal | Type | Zr | Zr | Zr | Zr |
| First Reactor Co-Catalyst 1 Type | Type | Co-Catalyst A | Co-Catalyst A | Co-Catalyst A | Co-catalyst A |
| First Reactor Co-Catalyst 2 Type | Type | Co-Catalyst B | Co-Catalyst B | Co-Catalyst B | Co-Catalyst B |
| First Reactor Co-Catalyst 1 to Catalyst Molar Ratio (B to Metal ratio) | Ratio | 1.2 | 1.0 | 1.1 | 1.1 |
| First Reactor Co-Catalyst 2 to Catalyst Molar Ratio (Al to Metal ratio) | Ratio | 31.1 | 17.9 | 17.9 | 21.3 |
| First Reactor Residence Time | min | 13.2 | 17.5 | 18.4 | 9.8 |
| Percentage of Total Ethylene Feed to First Reactor | wt % | 58.2% | 54.5% | 54.1% | 56.3% |
| Second Reactor Feed Solvent/Ethylene Mass Flow Ratio | g/g | 2.17 | 4.35 | 5.03 | 2.12 |
| Second Reactor Feed Comonomer/Ethylene Mass Flow Ratio | g/g | 0.099 | 0.101 | 0.275 | 0.071 |
| Second Reactor Feed Hydrogen/Ethylene Mass Flow Ratio | g/g | 1.04E−05 | 2.54E−04 | 2.40E−04 | 2.75E−04 |
| Second Reactor Temperature | °C. | 190 | 191 | 190 | 190 |
| Second Reactor Pressure | barg | 50 | 43 | 43 | 51 |
| Second Reactor Ethylene Conversion | % | 84.3 | 83.4 | 84.1 | 83.2 |
| Second Reactor Catalyst Type | Type | Catalyst Component B | Catalyst Component B | Catalyst Component B | Catalyst Component C |
| Second Reactor Catalyst Metal | Type | Ti | Ti | Ti | Zr |
| Second Reactor Co-Catalyst 1 Type | Type | | | | Co-Catalyst A |
| Second Reactor Co-Catalyst 2 Type | Type | Co-Catalyst C | Co-Catalyst C | Co-Catalyst C | Co-Catalyst B |
| Second Reactor Co-Catalyst 1 to Catalyst Molar Ratio (B to Metal ratio) | mol/mol | | | | 1.2 |
| Second Reactor Co-Catalyst 2 to Catalyst Molar Ratio (Al to Metal ratio) | mol/mol | 1.5 | 1.3 | 1.3 | 13.0 |
| Second Reactor Residence Time | min | 9.2 | 10.1 | 9.9 | 6.8 |

TABLE 2

Catalyst component A

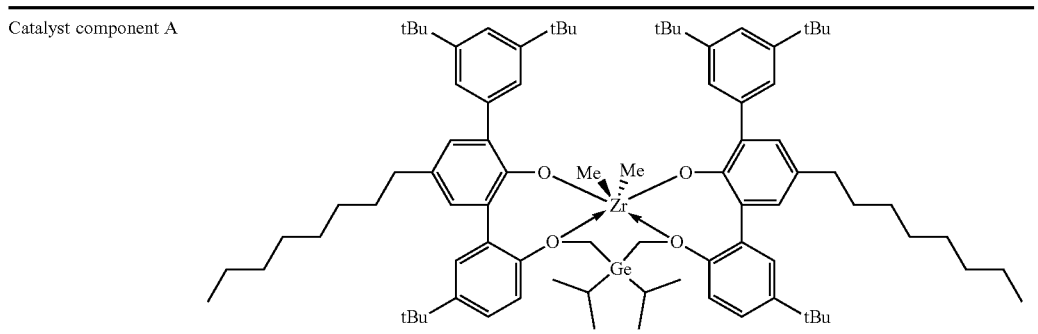

Catalyst component B    A Ziegler-Natta type catalyst. The heterogeneous Ziegler-Natta type catalyst-premix was prepared substantially according to U.S. Pat. No. 4,612,300, by sequentially adding to a volume of ISOPAR E, a slurry of anhydrous magnesium chloride in ISOPAR E, a solution of EtAlCl$_2$ in heptane, and a solution of Ti(O-iPr)$_4$ in heptane, to yield a composition containing a magnesium concentration TABLE 2-continued of 0.20M, and a ratio of Mg/Al/Ti of 40/12.5/3. An aliquot of this composition was further diluted with ISOPAR-E as needed to maintain a feed rate within capability of the system. While being fed to, and prior to entry into, the polymerization reactor, the catalyst premix was contacted with a dilute solution of $Et_3Al$, in the molar Al to Ti ratio specified in Table 1, to give the active catalyst.

Catalyst component C

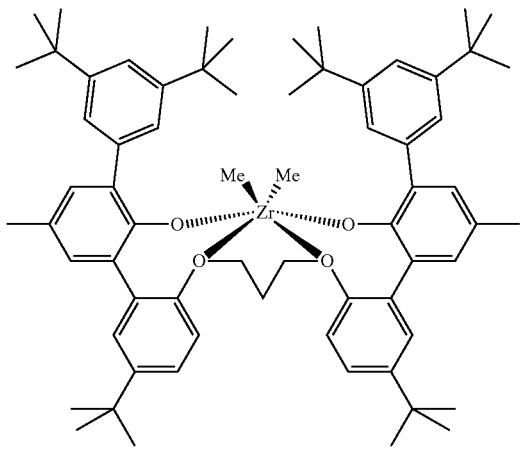

Co-catalyst A

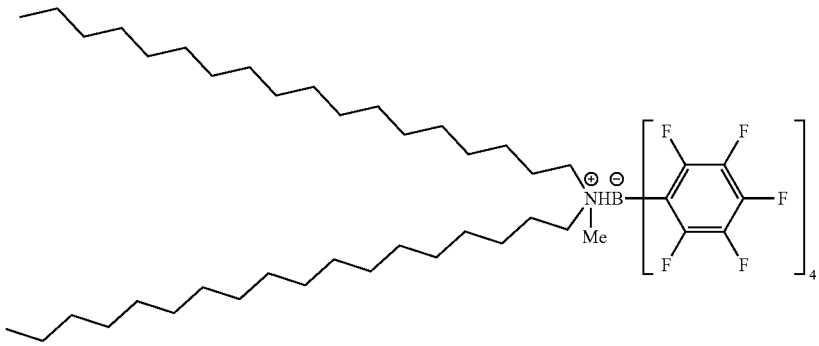

Co-catalyst B     modified methyl aluminoxane
Co-catalyst C     Tri-ethyl aluminum

Example 2: Comparative Compositions A-C

Table 3 identifies the commercially-available polyethylene compositions of Comparative Polyethylene Compositions ("Comparative PE Comp.") A-B. Comparative PE Composition C is as described above in Example 1.

TABLE 3

| Comparative PE Comp. | Commercial Name (Company of Manufacture) |
|---|---|
| A | ELITE ™ AT 6410 (The Dow Chemical Co.) |
| B | ELITE ™ AT 6501 (The Dow Chemical Co.) |

Example 3: Analysis of Inventive Polyethylene Compositions 1-3 of Example 1 and Comparative Polyethylene Compositions A-C of Example 2

Table 4 reports the densities and melt indices ($I_2$) for Inventive Polyethylene Compositions 1-3 and Comparative Polyethylene Compositions A-C. In addition, for some of the Compositions, molecular weights are measured using Gel Permeation Chromatography (GPC) and Molecular Weighted Comonomer Distribution Index (MWCDI) values are determined, each using the techniques described in the Test Methods section above. These values are shown in Table 4.

TABLE 4

| Sample ID | Dens. (g/cm$^3$) | $I_2$ (g/10 min) | $I_{10}/I_2$ | $M_w$ (g/mol) | $M_z$ (g/mol) | $M_w/M$ | MWCDI | ZSVR |
|---|---|---|---|---|---|---|---|---|
| Comparative PE Comp. A | 0.912 | 0.85 | 7.8 | 100967 | 217949 | 2.63 | −0.42 | |
| Comparative PE Comp. B | 0.914 | 0.85 | 7.9 | 101163 | 220649 | 2.75 | 0.37 | |
| Comparative PE Comp. C | 0.906 | 0.78 | 7.1 | 107996 | 242813 | 2.53 | 0.42 | 1.80 |

TABLE 4-continued

| Sample ID | Dens. (g/cm³) | I₂ (g/10 min) | $I_{10}/I_2$ | $M_w$ (g/mol) | $M_z$ (g/mol) | $M_w/M$ | MWCDI | ZSVR |
|---|---|---|---|---|---|---|---|---|
| Inventive PE Comp. 1 | 0.913 | 0.84 | 6.2 | 115593 | 276749 | 2.66 | 0.42 | 1.42 |
| Inventive PE Comp. 2 | 0.912 | 0.94 | 6.8 | 113716 | 282857 | 2.90 | | 1.40 |
| Inventive PE Comp. 3 | 0.908 | 0.89 | 6.5 | 116286 | 285791 | 3.02 | | 1.83 |

Inventive Polyethylene Compositions 1-3 of Example 1 and Comparative Polyethylene Compositions A-C of Example 2 are analyzed by iCCD. The data generated from the iCCD testing of all samples (Inventive Polyethylene Compositions 1-3 of Example 1 and Comparative Polyethylene Compositions A-C) is provided in Table 5. Specifically, Table 5 includes analysis of the iCCD data for three polyethylene fractions: 40° C. to 75° C., 75° C. to 85° C., and 85° C. to 110° C.

TABLE 5

| Sample ID | 40° C.-75° C. | 75° C.-85° C. | 85° C.-110° C. |
|---|---|---|---|
| Comparative PE Comp. A | 31.3% | 66.2% | 1.97% |
| Comparative PE Comp. B | 48.2% | 33.8% | 17.4% |
| Comparative PE Comp. C | 55.8% | 37.9% | 5.1% |
| Inventive PE Comp. 1 | 51.2% | 21% | 27% |
| Inventive PE Comp. 2 | 55.7% | 7.8% | 34% |
| Inventive PE Comp. 3 | 61.6% | 11.9% | 25% |

In addition, the weight average molecular weight ($M_w$) in each of the above-specified polyethylene fractions for Inventive Polyethylene Compositions 1-3 and for Comparative Compositions A-C are calculated from the iCCD as described in the Test Methods section. The data are shown in Table 6. Table 6 also shows the ratio of $M_w$ for the first polyethylene fraction ([A], 40° C.-75° C.) to the $M_w$ for the second polyethylene fraction ([B], 75° C.-85° C.) ("[A]/[B]"), and the ratio of $M_w$ for the second polyethylene fraction ([B], 75° C.-85° C.) to the $M_w$ of the third polyethylene fraction ([C], 85° C.-110° C.) ("[B]/[C]").

TABLE 6

| Sample ID | $M_w$ in 40° C.-75° C. Fraction, [A] | $M_w$ in 75° C.-85° C. Fraction, [B] | $M_w$ in 85° C.-110° C. Fraction, [C] | [A]/[B] | [B]/[C] |
|---|---|---|---|---|---|
| Comparative PE Comp. A | 71347 | 124278 | 114023 | 0.57 | 1.09 |
| Comparative PE Comp. B | 102148 | 119478 | 129296 | 0.85 | 0.92 |
| Comparative PE Comp. C | 120242 | 109497 | 130819 | 1.10 | 0.84 |
| Inventive PE Comp. 1 | 114561 | 123885 | 142318 | 0.92 | 0.87 |
| Inventive PE Comp. 2 | 125941 | 130656 | 105063 | 0.96 | 1.24 |
| Inventive PE Comp. 3 | 137238 | 87119 | 109785 | 1.58 | 0.79 |

Example 4: Analysis of Heat Seal Initiation Temperature and Hot Tack Initiation Temperature In Example 4, the heat seal initiation temperature, the hot tack initiation temperature, and the peak hot tack are analyzed for films comprising the polyethylene compositions described herein.

To analyze these properties, multilayer films are coextruded on an Alpine 7-layer blown film line. This line was equipped with seven 50 mm single screw extruders of 30 L/D and a 250 mm die. Three-layer (skin, core, and sealant) films with total thickness of 50 microns are made. The skin/core/sealant layer thickness ratio was set at 1/3/1 (10 microns/30 microns/10 microns). The skin layer comprised of an 80/20 (by weight) blend of DOWLEX™ 2045G/DOW™ LDPE 611A, both commercially available from The Dow Chemical Company. The base resin of the core layer comprised the same blend as the skin layer, but additionally with 500 ppm of 10090 Slip PE MB (erucamide, commercially available from Ampacet Corporation) and 10063 Antiblock PE MB (commercially available from Ampacet Corporation), which were added by dry blending. The polyethylene composition used in the sealant layer is varied, as provided in Table 7. 750 ppm of 10090 Slip PE MB and 2500 ppm of 10063 Antiblock PE MB are introduced in the sealant layer through dry blending. The die gap is set at 78.7 mils, the blow-up ratio is 2.5, the melt temperature was 440° F.-470° F., the output rate is 350 lb/hr and the frost line height was about 37 inches. The bubble of the multilayer film was slit in-line and separated into two rolls.

TABLE 7

| Sample | Sealant Layer |
|---|---|
| Comparative Film A | ELITE ™ AT 6410 (The Dow Chemical Co.) |
| Comparative Film B | ELITE ™ AT 6501 (The Dow Chemical Co.) |
| Comparative Film C | Comparative PE Comp. C |
| Inventive Film 1 | Inventive PE Comp. 1 |
| Inventive Film 2 | Inventive PE Comp. 2 |
| Inventive Film 3 | Inventive PE Comp. 3 |

Each of Inventive Films 1-3 and Comparative Films A-C are then laminated onto a 12 micron thick oriented polyethylene terephthalate (PET) film using a Nordmeccanica Super Combi 3000 laminator using a ADCOTE™ 577/CR 87-124 solvent-based adhesive, where the ADCOTE™ 577 and CR 87-124 components were mixed in a weight ratio of 100:7. Prior to applying the solvent-based adhesive, the skin side of each of Inventive Films 1-3 and Comparative Films A-C is dosed with 1 kW corona. The adhesive is applied using a 150 channel quad with 11.5 bcm, which produced a 1.75 lbs/rm coating weight via a Gravure roll, and subsequently nipped at 160° F. The films are cured at 25° C. and 40% relative humidity for at least 5-7 days for full chemical cure to produce Laminated Films 1-3 and Comparative Laminated Films A-C.

Hot tack measurements on the film are performed on each of Laminated Films 1-3 and Comparative Laminated Films A-C using an Enepay commercial testing machine according to ASTM F-1921 (Method B). Prior to testing the samples are conditioned for a minimum of 40 hrs at 23° C. and 50% R.H. per ASTM D-618 (Procedure A).

Sheets of dimensions 8.5" by 14" are cut from the film, with the longest dimension in the machine direction. Strips 1" wide and 14" long are cut from the film. Tests are performed on these samples over a range of temperatures and the results reported as the maximum load as a function of temperature. Typical temperature steps are 5° C. or 10° C. with 6 replicates performed at each temperature. The typical parameters used in the test are as follows:

Specimen Width: 25.4 mm (1.0 in)

Sealing Pressure: 0.275 N/mm$^2$

Sealing Dwell Time: 0.5 s

Delay time: 0.18 s

Peel speed: 200 mm/s

Seal depth=0.5 inch

A hot tack curve is created by linear interpolation of the average maximum load measured at each temperature. The minimum temperature at which an average maximum load of 4N was achieved (defined as hot tack initiation temperature) is determined from this curve, and is reported in Table 8. Also shown is the maximum average load determined from the hot tack curve (defined as peak hot tack).

Heat Seal measurements on the film are performed on each of Laminated Films 1-3 and Comparative Laminated Films A-C a commercial tensile testing machine according to ASTM F-88 (Technique A).

Prior to cutting, the films are conditioned for a minimum of 40 hrs at 23° C. (±2° C.) and 50% (±10%) R.H. per ASTM D-618 (procedure A). Sheets are then cut from the film in the machine direction to a length of approximately 11 inches and a width of approximately 8.5 inches. The sheets are heat sealed across the machine direction on a Kopp Heat Sealer over a range of temperatures under the following typical conditions:

Sealing Pressure: 0.275 N/mm$^2$

Sealing Dwell Time: 0.5 s (<1 mil) or 1.0 s (>1 mil)

Depth of seal=5 mm

The sealed sheets are conditioned for a minimum of 3 hours at 23°(±2° C.) and 50% R.H (±10%) prior to cutting into one inch wide strips. The samples are conditioned for a minimum of 24 hours after sealing at 23°(±2° C.) and 50% R.H (±10%) prior to testing.

For testing, the strips are loaded into the grips of a tensile testing machine at an initial separation of 2 inches and pulled at a grip separation rate of 10 inches/min at 23°(±2° C.) and 50% R.H (±10%). The strips are tested unsupported. Five replicate tests are performed for each sealing temperature.

The maximum load measured during the peel is determined at multiple sealing temperatures, and a heat seal curve created by linear interpolation of the average maximum load measured at each temperature. The temperature at which an average maximum load of 2 lb was achieved (defined as heat seal initiation temperature) determined from this curve, and is provided subsequently in Table 8.

TABLE 8

| Sample | Hot Tack Initiation Temperature (° C.) | Peak Hot Tack (N) | Heat Seal Initiation Temperature (° C.) |
| --- | --- | --- | --- |
| Laminated Comparative Film A | 109 | 17.7 | 90 |
| Laminated Comparative Film B | 103 | 12.8 | 84 |
| Laminated Comparative Film C | 99 | 15.3 | 82 |
| Laminated Film 1 | 98 | 14.8 | 82 |
| Laminated Film 2 | 88 | 12.8 | 82 |
| Laminated Film 3 | 86 | 13.2 | <80 |

It is known that the heat seal initiation temperature and hot-tack initiation temperature are affected by the overall density of the polyethylene compositions. Accordingly, the appropriate comparisons for Table 8 are: (1) Laminated Films 1-2 against Laminated Comparative Films 1-2, and (2) Laminated Film 3 against Laminated Comparative Film C. As shown in Table 8, within each comparable set, utilizing polyethylene compositions in accordance with some embodiment of the present invention, exhibited the lowest hot tack initiation temperatures and lower heat seal initiation temperatures than the Comparative PE Compositions.

What is claimed is:

1. A polyethylene composition suitable for packaging applications comprising:
    (a) a first polyethylene fraction having a single peak in a temperature range of 40° C. to 75° C. in an elution profile via improved comonomer composition distribution (iCCD) analysis method, wherein a first polyethylene area fraction is an area in the elution profile beneath the single peak of the first polyethylene fraction between 4° and 75° C., and wherein the first polyethylene fraction area comprises from 45% to 65% of the total area of the elution profile; and
    (b) a second polyethylene fraction having at least one peak in a temperature range of 85° C. to 110° C. in the elution profile via iCCD analysis method, and wherein a second polyethylene area fraction is an area in the elution profile beneath the at least one peak of the second polyethylene fraction between 85° C. and 110° C., and wherein the second polyethylene fraction area comprises from 15% to 35% of the total area of the elution profile;
wherein the polyethylene composition has a density of 0.905 g/cm$^3$ to 0.918 g/cm$^3$, a melt index ($I_2$) of 0.7 g/10 minutes to 3.5 g/10 minutes, and wherein the composition has a melt index ratio ($I_{10}/I_2$) that meets the following equation: $I_{10}/I_2 < 7.0 - 1.2 \log(I_2)$.

2. The polyethylene composition of claim 1, wherein a ratio of a weight average molecular weight for the first polyethylene fraction in a temperature range of 40° C. to 75° C. in an elution profile via iCCD analysis method to a weight average molecular weight of a third polyethylene fraction in a temperature range of 75° C. to 85° C. in an elution profile via iCCD analysis method is 0.90 to 1.6.

3. The polyethylene composition of claim 2, wherein a ratio of the weight average molecular weight of the third polyethylene fraction to a weight average molecular weight for the second polyethylene fraction in a temperature range of 85° C. to 110° C. in an elution profile via iCCD analysis method is 0.50 to 1.50.

4. The polyethylene composition of claim 1, wherein the polyethylene composition has a zero shear viscosity ratio of less than 2.0.

5. The polyethylene composition of claim 1, wherein the polyethylene composition has a molecular weight distribution, expressed as the ratio of the weight average molecular weight to number average molecular weight (Mw/Mn) in the range of from 2.0 to 3.5.

6. The polyethylene composition of claim 1, wherein the polyethylene composition has a molecular weight comonomer distribution index (MWCDI) of less than 1.0.

7. A film comprising the polyethylene composition according to claim 1.

8. A multilayer film comprising a sealant layer, wherein the sealant layer comprises the polyethylene composition according to claim 1.

9. An article comprising the polyethylene composition according to claim 1.

* * * * *